US008320658B2

(12) United States Patent
Tanizaki et al.

(10) Patent No.: US 8,320,658 B2
(45) Date of Patent: Nov. 27, 2012

(54) UNEVENNESS INSPECTION METHOD, METHOD FOR MANUFACTURING DISPLAY PANEL, AND UNEVENNESS INSPECTION APPARATUS

(75) Inventors: Hiroyuki Tanizaki, Kanagawa-ken (JP); Naoko Toyoshima, Kanagawa-ken (JP); Yosuke Okamoto, Kanagawa-ken (JP); Yasunori Takase, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1067 days.

(21) Appl. No.: 11/851,806

(22) Filed: Sep. 7, 2007

(65) Prior Publication Data

US 2008/0063254 A1 Mar. 13, 2008

(30) Foreign Application Priority Data

Sep. 7, 2006 (JP) ................................. 2006-243274

(51) Int. Cl.
*G01N 21/00* (2006.01)
*G06K 9/00* (2006.01)

(52) U.S. Cl. ........ 382/141; 382/144; 382/148; 382/152; 348/177; 348/191

(58) Field of Classification Search .................. 382/141, 382/144, 148, 152; 348/177, 191
See application file for complete search history.

(56) References Cited

U.S. PATENT DOCUMENTS

| 5,185,638 A * | 2/1993 | Conzola et al. ............. 356/237.2 |
| 5,650,844 A * | 7/1997 | Aoki et al. .................. 356/237.2 |
| 5,686,959 A * | 11/1997 | Hayashi et al. ............... 348/126 |
| 5,696,550 A * | 12/1997 | Aoki et al. .................... 348/125 |
| 5,717,780 A * | 2/1998 | Mitsumune et al. .......... 382/141 |
| 5,734,158 A * | 3/1998 | Nagashima et al. .......... 250/225 |
| 5,764,209 A * | 6/1998 | Hawthorne et al. ............. 345/87 |
| 5,966,458 A * | 10/1999 | Yukawa et al. ................ 382/141 |
| 6,177,955 B1 * | 1/2001 | Downen et al. ............... 348/189 |
| 6,198,529 B1 * | 3/2001 | Clark et al. ................. 356/237.5 |
| 6,362,802 B1 * | 3/2002 | Fujiwara et al. ................ 345/87 |
| 6,600,468 B1 * | 7/2003 | Kim et al. ........................ 345/87 |
| 6,678,404 B1 * | 1/2004 | Lee et al. ....................... 382/155 |
| 6,809,746 B2 * | 10/2004 | Whittington et al. ......... 345/690 |

(Continued)

FOREIGN PATENT DOCUMENTS

JP 2003-66398 3/2003

(Continued)

OTHER PUBLICATIONS

Watson, Andrew. United States. Flat Panel Display Defect Measurement Using a Human Vision Model. Moffet Field: NASA, 2005. Print.*

(Continued)

*Primary Examiner* — Michael A Newman
(74) *Attorney, Agent, or Firm* — Oblon, Spivak, McClelland, Maier & Neustadt, L.L.P.

(57) ABSTRACT

An unevenness inspection method for inspecting presence of unevenness in a panel material, the method includes: acquiring a plurality of primary images by imaging the panel material under inspection on a plurality of levels of condition; creating a plurality of secondary images by processing the plurality of primary images to enhance variation of the image; creating a composite image by combining the plurality of secondary images with a prescribed weighting; and determining the presence of unevenness using the composite image, the prescribed weighting being determined so that a region having the unevenness can be distinguished from the other region, when the plurality of secondary images are created for the panel material for training use having unevenness and are combined into a composite image.

8 Claims, 20 Drawing Sheets

U.S. PATENT DOCUMENTS

| | | | |
|---|---|---|---|
| 6,987,571 B2 * | 1/2006 | Yamakawa et al. | 356/600 |
| 7,308,157 B2 * | 12/2007 | Safaee-Rad et al. | 382/294 |
| 2003/0053713 A1 * | 3/2003 | Romanik et al. | 382/284 |
| 2003/0059101 A1 * | 3/2003 | Safaee-Rad et al. | 382/141 |
| 2004/0213449 A1 * | 10/2004 | Safaee-Rad et al. | 382/141 |
| 2006/0165311 A1 * | 7/2006 | Watson | 382/286 |
| 2007/0047801 A1 * | 3/2007 | Kojima et al. | 382/149 |

FOREIGN PATENT DOCUMENTS

| | | |
|---|---|---|
| TW | 490552 | 6/2002 |
| TW | 554312 | 9/2003 |

OTHER PUBLICATIONS

Pratt, et al. "Automatic Blemish Detection in Liquid Crystal Flat Panel Displays." SPIE Proceedings of Machine Vision Applications in Industrial Inspection VI. 3306. (1998): 2-13. Print.*

Mori, et al. "Quantitative Evaluation of "mura" in Liquid Crystal Displays." Opt. Eng. 43.11 (2004): 2696-2700. Print.*

Taiwanese Office Action issued on Mar. 8, 2011 in corresponding Taiwanese Application No. 096131718.

* cited by examiner

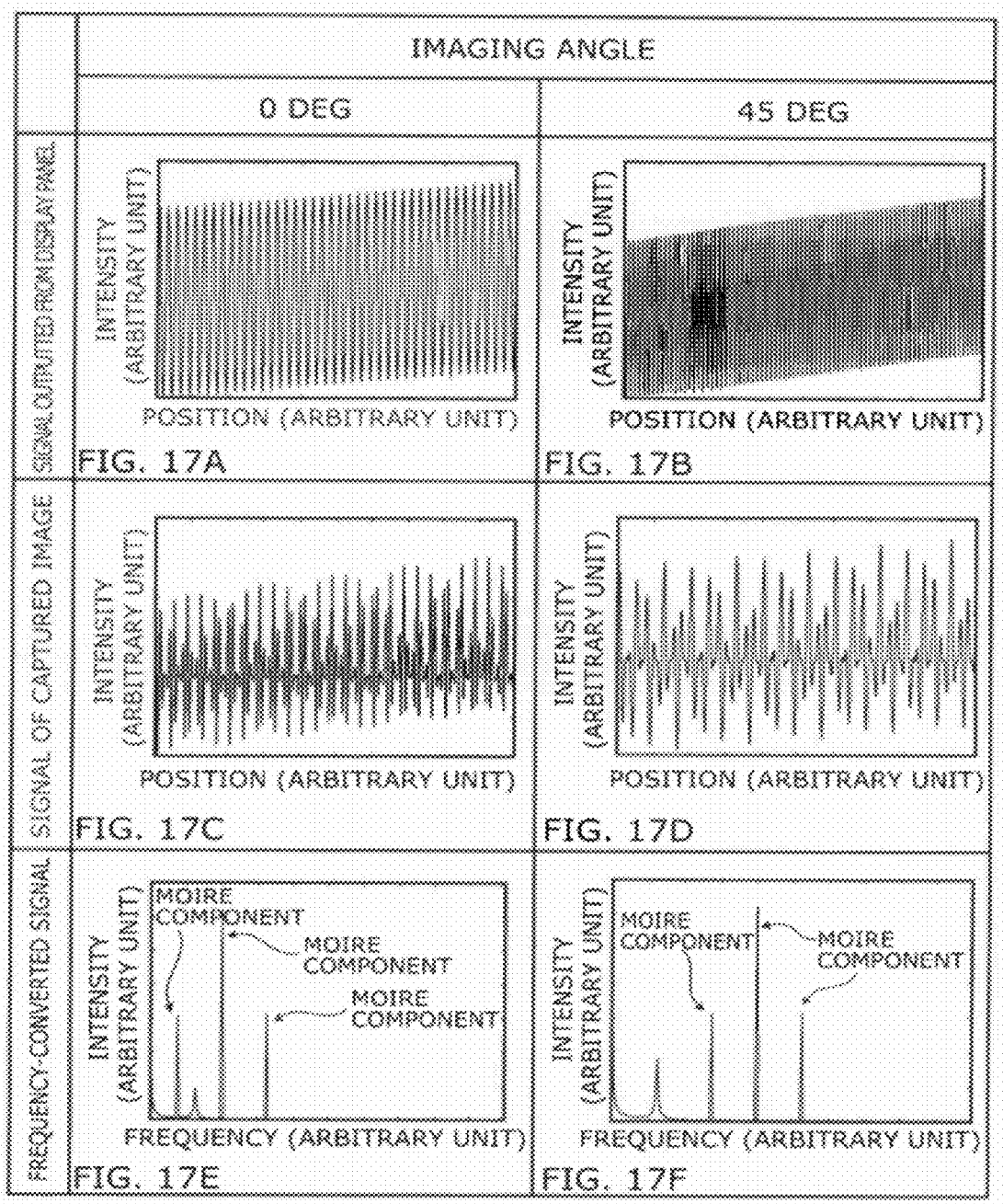

BASIC CONDITION

MAGNIFICATION RATIO VARYING CONDITION

IMAGING ANGLE VARYING CONDITION

UNEVENNESS INSPECTION METHOD, METHOD FOR MANUFACTURING DISPLAY PANEL, AND UNEVENNESS INSPECTION APPARATUS

CROSS-REFERENCE TO RELATED APPLICATIONS

This application is based upon and claims the benefit of priority from the prior Japanese Patent Application No. 2006-243274, filed on Sep. 7, 2006; the entire contents of which are incorporated herein by reference.

BACKGROUND OF THE INVENTION

1. Field of the Invention

This invention relates to an unevenness inspection method, a method for manufacturing a display panel, and an unevenness inspection apparatus, and more particularly to an unevenness inspection method for inspecting the presence of unevenness in a panel material, a method for manufacturing a display panel using this unevenness inspection method, and an unevenness inspection apparatus for inspecting the presence of unevenness in a panel material.

2. Background Art

Conventionally, in manufacturing a liquid crystal display panel, the assembled panel is inspected for the presence of unevenness. The unevenness inspection is performed by sensory test based on visual observation by a human inspector, and hence presents a problem of high inspection cost.

In a recently proposed technique to solve this problem, a panel material under inspection is imaged by a camera, and a spatial differential filter is applied to the acquired image to automatically detect unevenness (e.g., JP 2003-066398A). However, in this conventional automatic inspection method, there is a problem of mismatch between the inspection result and the result of the inspector's sensory test, which hinders its practical application.

SUMMARY OF THE INVENTION

According to an aspect of the invention, there is provided an unevenness inspection method for inspecting presence of unevenness in a panel material, the method including: acquiring a plurality of primary images by imaging the panel material under inspection on a plurality of levels of condition; creating a plurality of secondary images by processing the plurality of primary images to enhance variation of the image; creating a composite image by combining the plurality of secondary images with a prescribed weighting; and determining the presence of unevenness using the composite image, the prescribed weighting being determined so that a region having the unevenness can be distinguished from the other region when the plurality of secondary images are created for the panel material for training use having unevenness and are combined into a composite image.

According to an aspect of the invention, there is provided a method for manufacturing a display panel, including: assembling a display panel; and inspecting the display panel to inspect whether unevenness occurs in the display panel, in inspecting, an unevenness inspection method for inspecting presence of unevenness in a panel material, the method comprising: acquiring a plurality of primary images by imaging the panel material under inspection on a plurality of levels of condition; creating a plurality of secondary images by processing the plurality of primary images to enhance variation of the image; creating a composite image by combining the plurality of secondary images with a prescribed weighting; and determining the presence of unevenness using the composite image, the prescribed weighting being determined so that a region having the unevenness can be distinguished from the other region, when the plurality of secondary images are created for the panel material for training use having unevenness and are combined into a composite image, being performed using the display panel as the panel material under inspection.

According to an aspect of the invention, there is provided an unevenness inspection apparatus for inspecting presence of unevenness in a panel material, the apparatus including: an imaging unit configured to image the panel material under inspection on a plurality of levels of condition; and a computing unit configured to create a plurality of secondary images by processing a plurality of primary images acquired by the imaging to enhance variation of the image, to create a composite image by combining the plurality of secondary images with a prescribed weighting, and to determine the presence of unevenness using the composite image, the prescribed weighting being determined so that a region having the unevenness can be distinguished from the other region when the plurality of secondary images are created for the panel material for training use having unevenness and are combined into a composite image.

BRIEF DESCRIPTION OF THE DRAWINGS

FIG. 11A shows a filter formed by combination of two, positive and negative, Gaussian functions. FIG. 11B shows a filter expressed by one function equivalent to that of FIG. 11A.

FIG. 13A shows a composite image, FIG. 13B shows a binary image obtained by binarizing the composite image shown in FIG. 13A, FIG. 13C shows another composite image, and FIG. 13D shows a binary image obtained by binarizing the composite image shown in FIG. 13C.

FIGS. 17A to 17F are graphs illustrating the signal processing method in the fourth example, where the horizontal axis represents position on the image or frequency, and the vertical axis represents signal intensity.

DETAILED DESCRIPTION OF THE INVENTION

Embodiments of the invention will now be described with reference to the drawings.

To begin with, a first embodiment of the invention is described.

Figure 1:
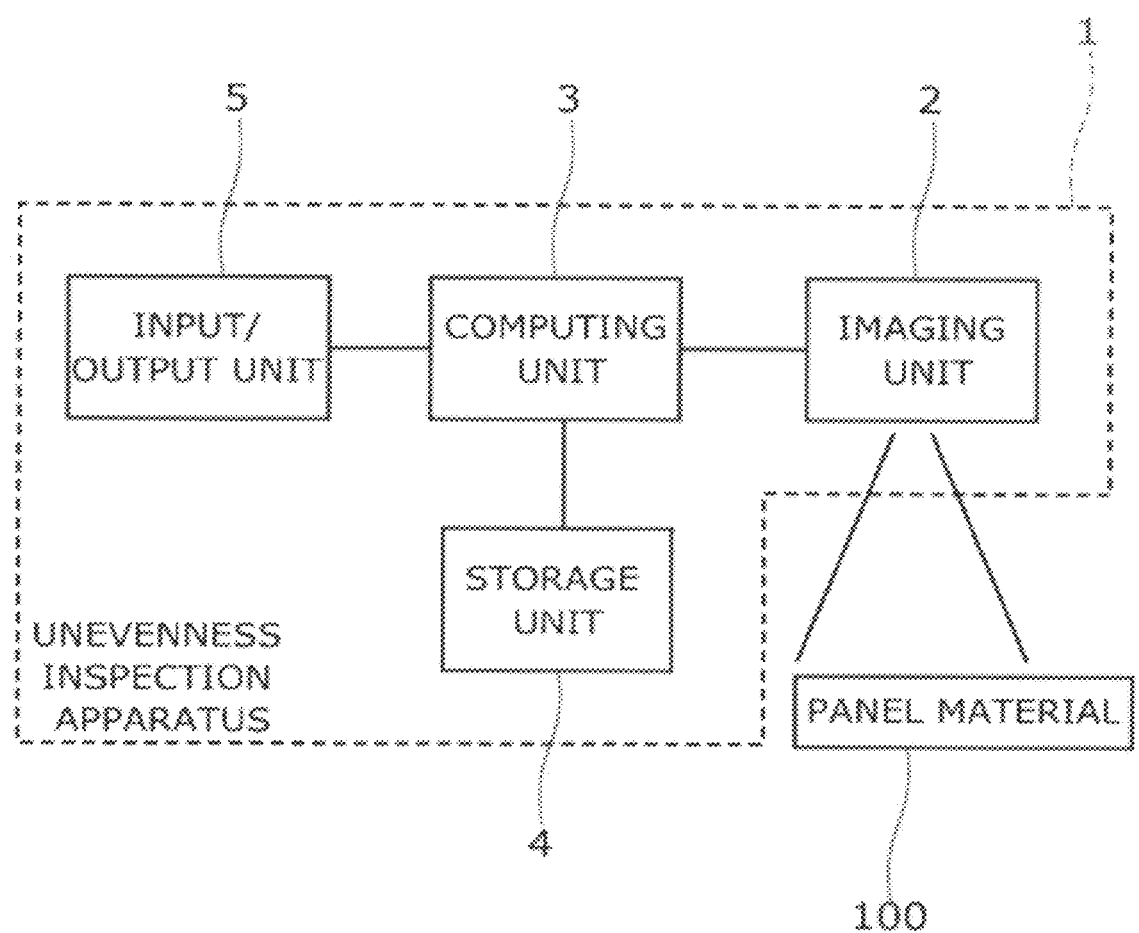
FIG. 1 is a block diagram illustrating an unevenness inspection apparatus according to the first embodiment of the invention.

FIG. 1 is a block diagram illustrating an unevenness inspection apparatus according to this embodiment.

As shown in FIG. 1, the unevenness inspection apparatus 1 according to this embodiment is an apparatus for inspecting the presence of "unevenness" in a panel material 100. "Unevenness" refers to a region on the surface of a plate-like member (panel material), the region having a certain area and different appearance in tone or brightness as compared with the other region and being recognized as a defect. The panel material 100 is illustratively an FPD (flat panel display) or other display panel having a plurality of periodically arranged image elements, and more specifically, an LCD (liquid crystal display). The unevenness inspection apparatus 1 comprises an imaging unit 2, a computing unit 3, a storage unit 4, and an input/output unit 5. The computing unit 3 is connected to the imaging unit 2, the storage unit 4, and the input/output unit 5.

The imaging unit 2 is an apparatus for imaging the panel material 100 under inspection on a plurality of levels of condition, and illustratively includes an imaging device having a plurality of periodically arranged imaging components. The "condition" refers to one or more conditions selected from the group consisting of imaging angle, illumination brightness, zoom factor, focus position, light exposure, aperture, and shutter speed, for example. In the case where the panel material 100 is a display panel for displaying images, the condition further includes the tone and gradation of a test pattern displayed on the panel material.

In the computing unit 3, a plurality of primary images are acquired on the basis of the images captured by the imaging unit 2. The plurality of primary images are processed so as to enhance the variation therein for creating a plurality of secondary images. The plurality of secondary images are combined into a composite image. Then the computing unit 3 determines the presence of unevenness on the basis of the composite image. In combining the secondary images into a composite image, a weighting stored beforehand in the storage unit 4 is applied. The "weighting" refers to a set of coefficients by which the pixel values of the secondary image are multiplied, the set consisting of as many values as the number of the secondary images. The weighting has been determined so that a region having unevenness can be distinguished from the other region in a composite image created by combination of a plurality of secondary images resulting from a training panel material having unevenness. In the case where the panel material 100 is an FPD, moire may occur in the captured image due to the difference between the arrangement period of image elements in the FPD and the arrangement period of imaging components in the imaging unit 2. In this case, the computing unit 3 acquires primary images by removing moire from the captured image. The computing unit 3 is illustratively implemented by a CPU (Central Processing Unit) of a personal computer, and illustratively also serves as a controller for the imaging unit 2 and the storage unit 4.

The storage unit 4 is an apparatus for storing the primary images acquired by the imaging operation of the imaging unit 2, the weighting used by the computing unit 3, and the computation result obtained by the computing unit 3, that is, the secondary images, the composite image, and the determination result. The storage unit 4 is illustratively implemented by an HDD (Hard Disk Drive) or other storage device.

The input/output unit 5 is an interface with a user, serving to input commands to the computing unit 3 and to display information outputted from the computing unit 3. The input/output unit 5 also serves as an interface for inputting the above-described weighting to the storage unit 4. The input/output unit 5 is illustratively composed of a keyboard and a display. The computing unit 3, the storage unit 4, and the input/output unit 5 may be implemented by a single personal computer.

Next, a description is given of the operation of the unevenness inspection apparatus according to this embodiment configured as described above, that is, an unevenness inspection method according to this embodiment.

Figure 2:
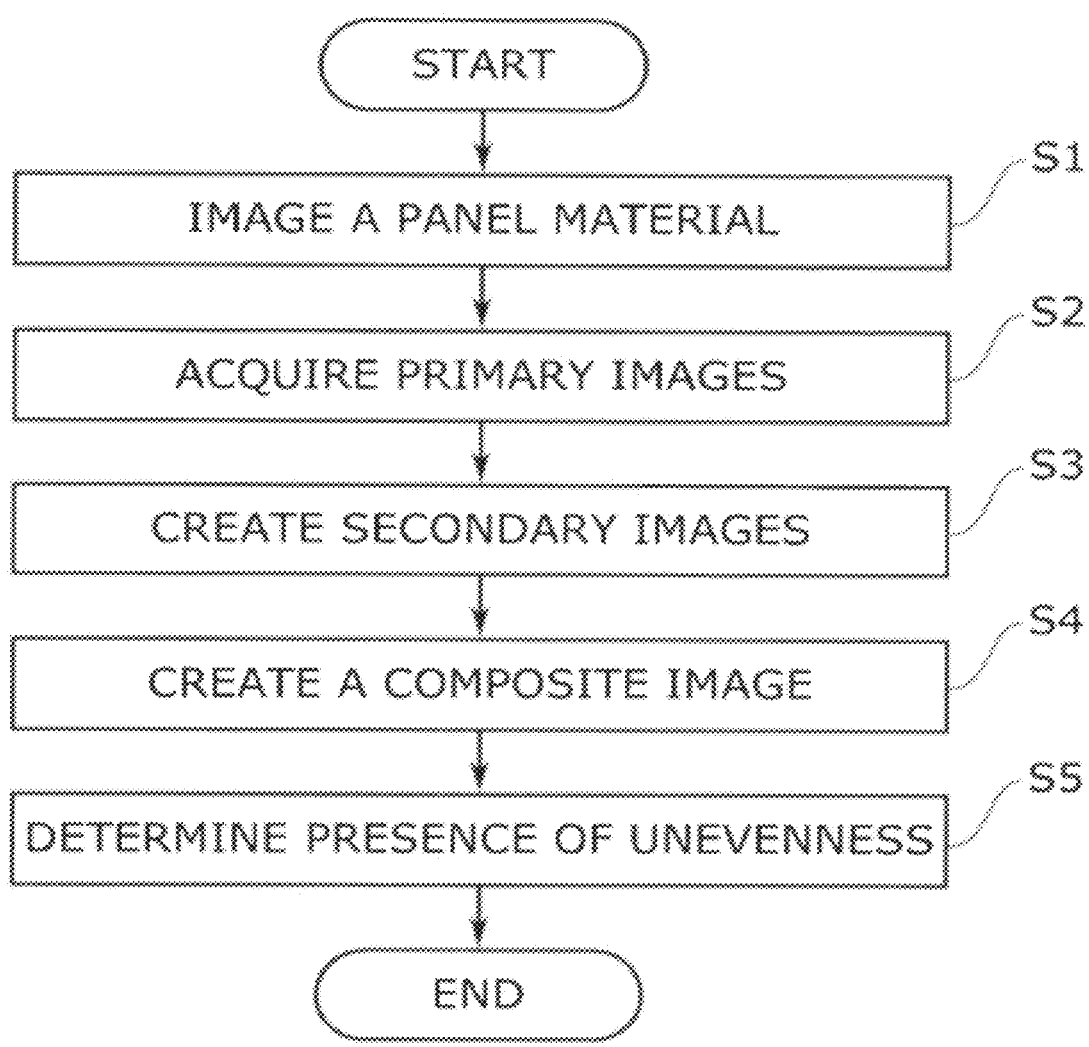
FIG. 2 is a flow chart illustrating an unevenness inspection method according to the first embodiment of the invention.

FIG. 2 is a flow chart illustrating an unevenness inspection method according to this embodiment.

Figure 3:
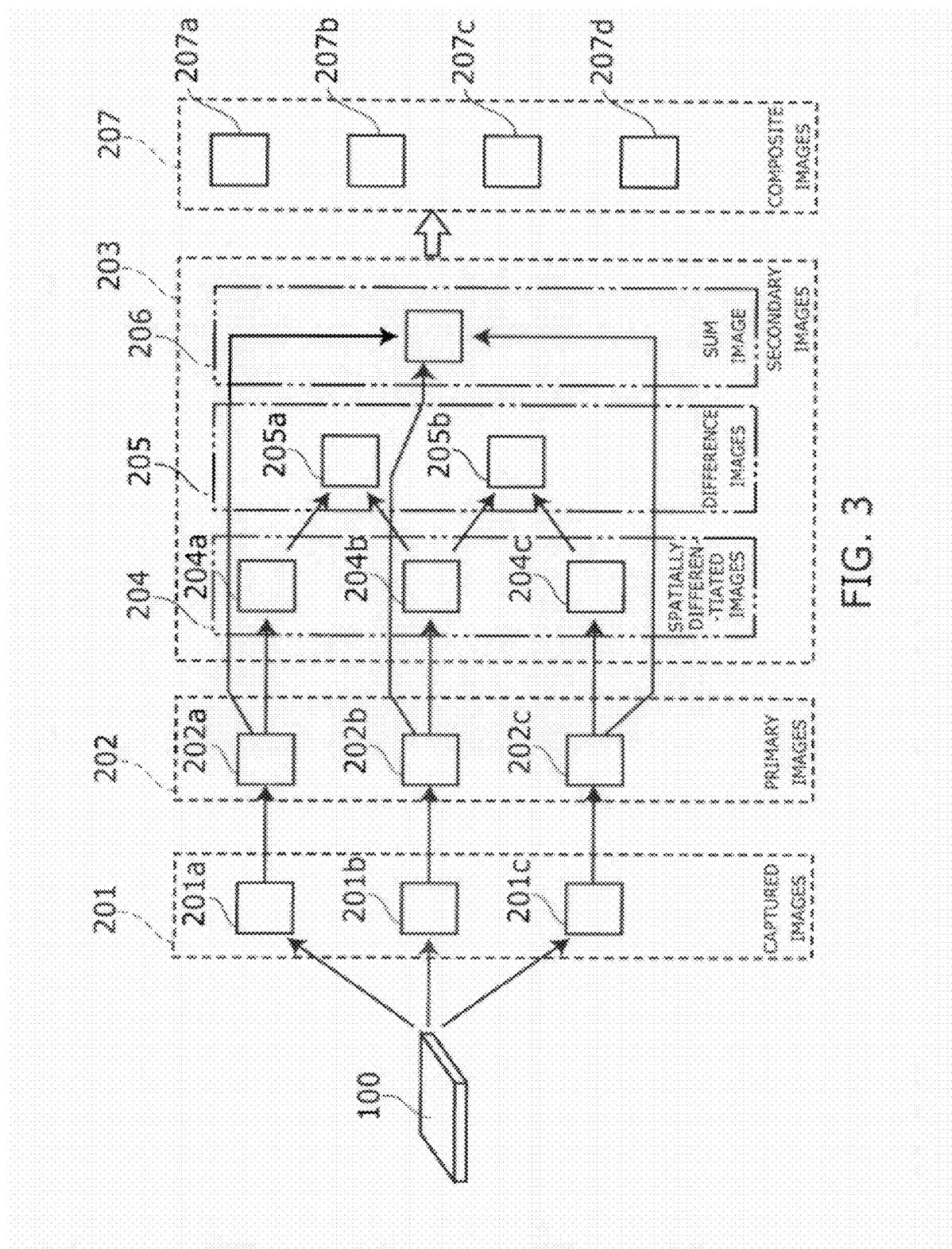
FIG. 3 illustrates a flow of image information in the unevenness inspection method according to the first embodiment of the invention.

FIG. 3 illustrates a flow of image information in the unevenness inspection method according to this embodiment.

First, a weighting for use in combining secondary images is stored beforehand in the storage unit 4. This weighting is determined as follows. A panel material determined to have unevenness by a human inspector is prepared as a training panel material. A plurality of secondary images are created for this training panel material. The weighting is determined so that, when the secondary images are combined into a composite image using the above weighting, a region having unevenness can be distinguished from the other region in the composite image. For example, in a composite image associated with the training panel material, the weighting is determined so as to locally maximize the ratio of the brightness entropy of the region having unevenness to the brightness entropy of the other region. This weighting is determined for each type of unevenness.

After the weighting is stored in the storage unit 4, a subject panel material 100 is inspected. This is described below with reference to FIGS. 2 and 3.

First, as shown in step S1 of FIG. 2, the imaging unit 2 images the panel material 100 a plurality of times on a plurality of levels of condition. The condition includes imaging angle, illumination brightness, zoom factor, focus position, light exposure, aperture, and shutter speed, for example. In the case where the panel material 100 is a display panel, the condition may include the tone and gradation of a test pattern displayed on the display panel. For example, the panel material 100 is imaged three times with the imaging angle varied in three levels. Thus the imaging unit 2 outputs e.g. three captured images 201a, 201b, and 201c (hereinafter also collectively referred to as "captured images 201") to the computing unit 3.

Next, as shown in step S2, the computing unit 3 acquires primary images 202a to 202c (hereinafter also collectively referred to as "primary images 202") from the captured images 201, respectively. More specifically, the computing unit 3 acquires a primary image 202a from the captured image 201a, a primary image 202b from the captured image 201b, and a primary image 202c from the captured image 201c. Here, if moire occurs in the captured image, a process for removing moire is performed. Furthermore, correction is performed as needed, such as image quality correction for enhancing contrast and shape correction for normalizing the shape of the image. If there is no need for such process and correction on the captured image 201, the captured image 201 is directly used as a primary image 202.

Next, as shown in step S3, a process for enhancing image variation is applied to the plurality of primary images 202 to create a plurality of secondary images 203.

For example, the primary images 202a to 202c are spatially differentiated to create spatially differentiated images 204a to 204c (hereinafter also collectively referred to as "spatially differentiated images 204"), respectively.

Furthermore, the spatially differentiated images 204 created from two primary images 202 imaged on different levels of condition are used to create a difference image 205. For example, the spatially differentiated images 204a and 204b are used to create a difference image 205a thereof, and the spatially differentiated images 204b and 204c are used to create a difference image 205b thereof.

Moreover, three primary images 202a to 202c imaged on different levels of condition are used to create one sum image 206. More specifically, for each region (hereinafter referred to as "particular region") in the sum image 206, the pixel value of the particular region in the sum image 206 is obtained by adding up, at a prescribed ratio, the pixel value of a region in the primary image 202a corresponding to the particular region, the pixel value of a region in the primary image 202b corresponding to a region next to the particular region, and the pixel value of a region in the primary image 202c corresponding to a region further next to the region next to the particular region. The sum image 206 is created by repeating this addition with every region in the sum image 206 successively taken as a particular region.

The spatially differentiated images 204a to 204c, the difference images 205a and 205b, and the sum image 206 are the secondary images 203.

Next, as shown in step S4, all the secondary images 203 are combined into a composite image 207 using the prescribed weighting stored in the storage unit 4. The composite image 207 is created for each weighting, that is, for each type of unevenness. For example, if four types of unevenness are known, four weightings are stored in the storage unit 4, and four composite images 207a to 207d are created for these weightings, respectively.

Next, as shown in step S5, the presence of unevenness is determined on the basis of the composite images 207a to 207d. For example, if no unevenness is found in all the composite images 207a to 207d, the panel material 100 is determined as "unevenness-free", and if any unevenness is found in at least one image of the composite images 207a to 207d, the panel material 100 is determined as "unevenness-bearing".

According to this embodiment, the weighting applied for creating a composite image from secondary images in the process shown in step S4 of FIG. 2 is determined so that the region previously determined to have unevenness by a human inspector is also determined to have unevenness by this inspection method and that the region determined to have no unevenness by the human inspector is also determined to have no unevenness by this inspection method. This embodiment can thus provide an unevenness inspection method and an unevenness inspection apparatus that can produce results close to the results of sensory test by a human inspector.

Next, a description is given of a second embodiment, which relates to a method for manufacturing a display panel.

Figure 4:
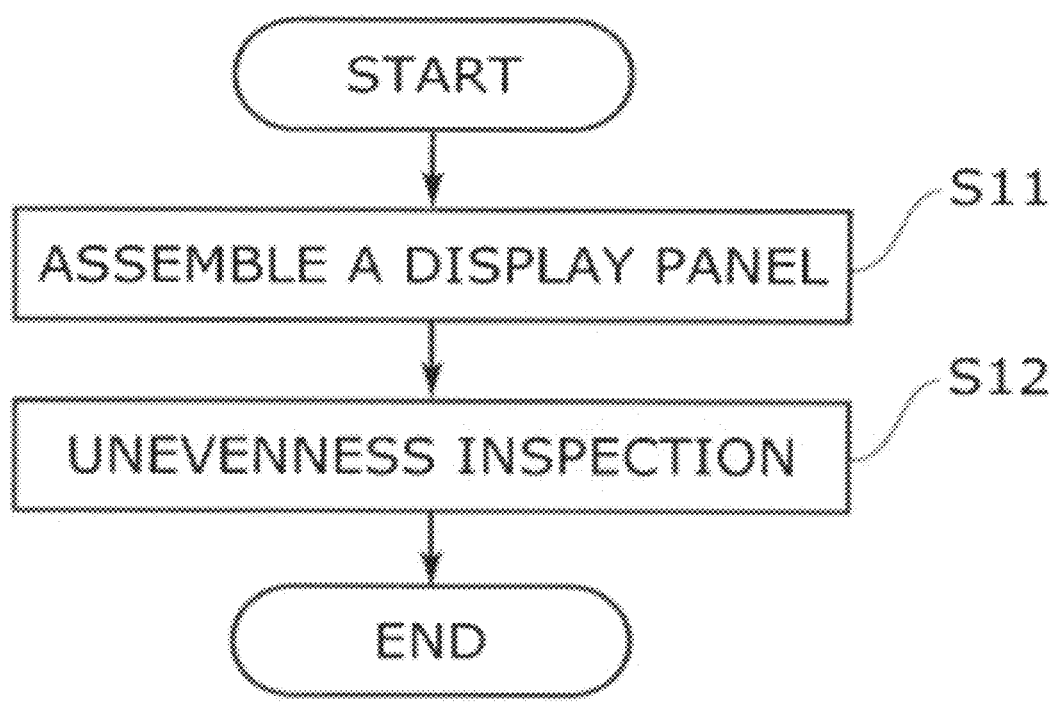
FIG. 4 is a flow chart illustrating a method for manufacturing a display panel according to the second embodiment of the invention.

FIG. 4 is a flow chart illustrating a method for manufacturing a display panel according to this embodiment.

First, as shown in step S11 of FIG. 4, a display panel is assembled. Next, as shown in step S12, the assembled display panel is subjected to unevenness inspection. Here, in the unevenness inspection process shown in step S12, the unevenness inspection method in the first embodiment described above (see FIG. 2) is performed. Thus the display panel is manufactured.

According to this embodiment, the unevenness inspection process can be automated, and hence display panels can be manufactured with high productivity.

Next, examples for implementing the above embodiments are described.

To begin with, a description is given of a first example, which is an example of the first embodiment described above. In the unevenness inspection apparatus according to this example, the panel material subjected to unevenness inspection is illustratively an LCD constituting the display screen of a mobile phone.

Figure 5:
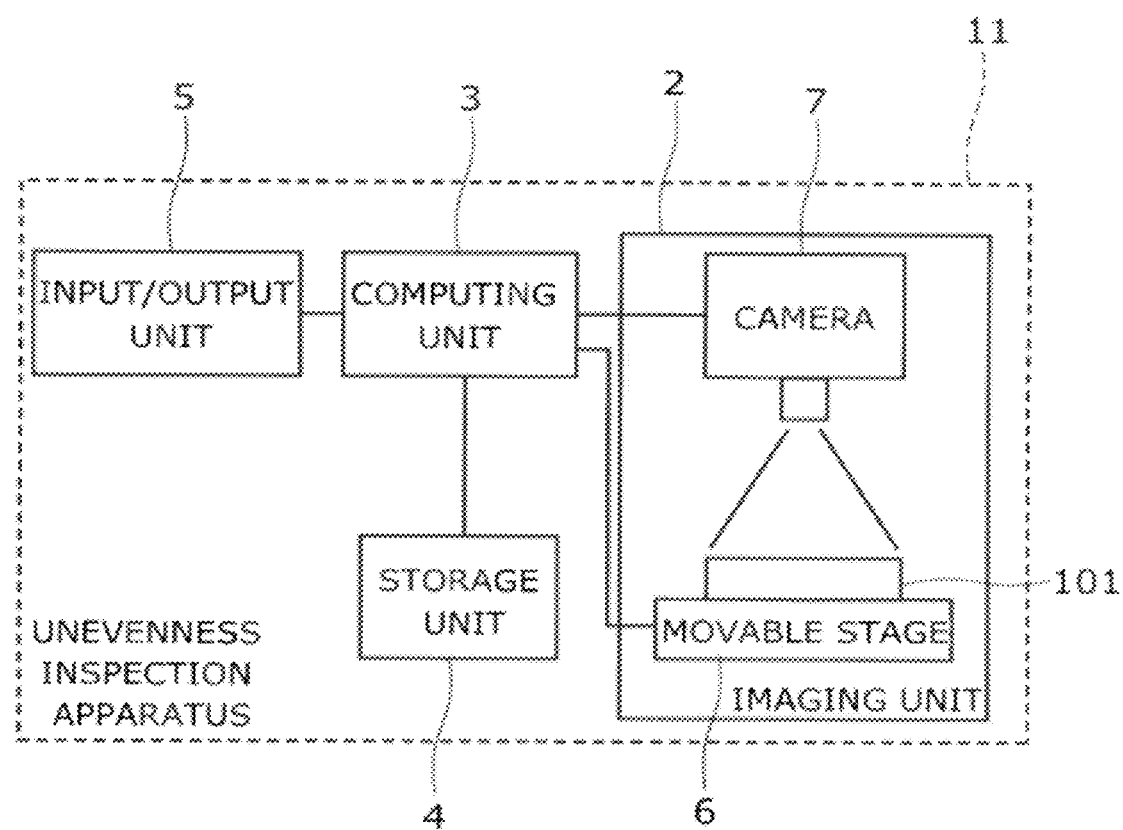
FIG. 5 is a block diagram illustrating an inspection apparatus according to the first example.

FIG. 5 is a block diagram illustrating an inspection apparatus according to this example.

Figure 6:
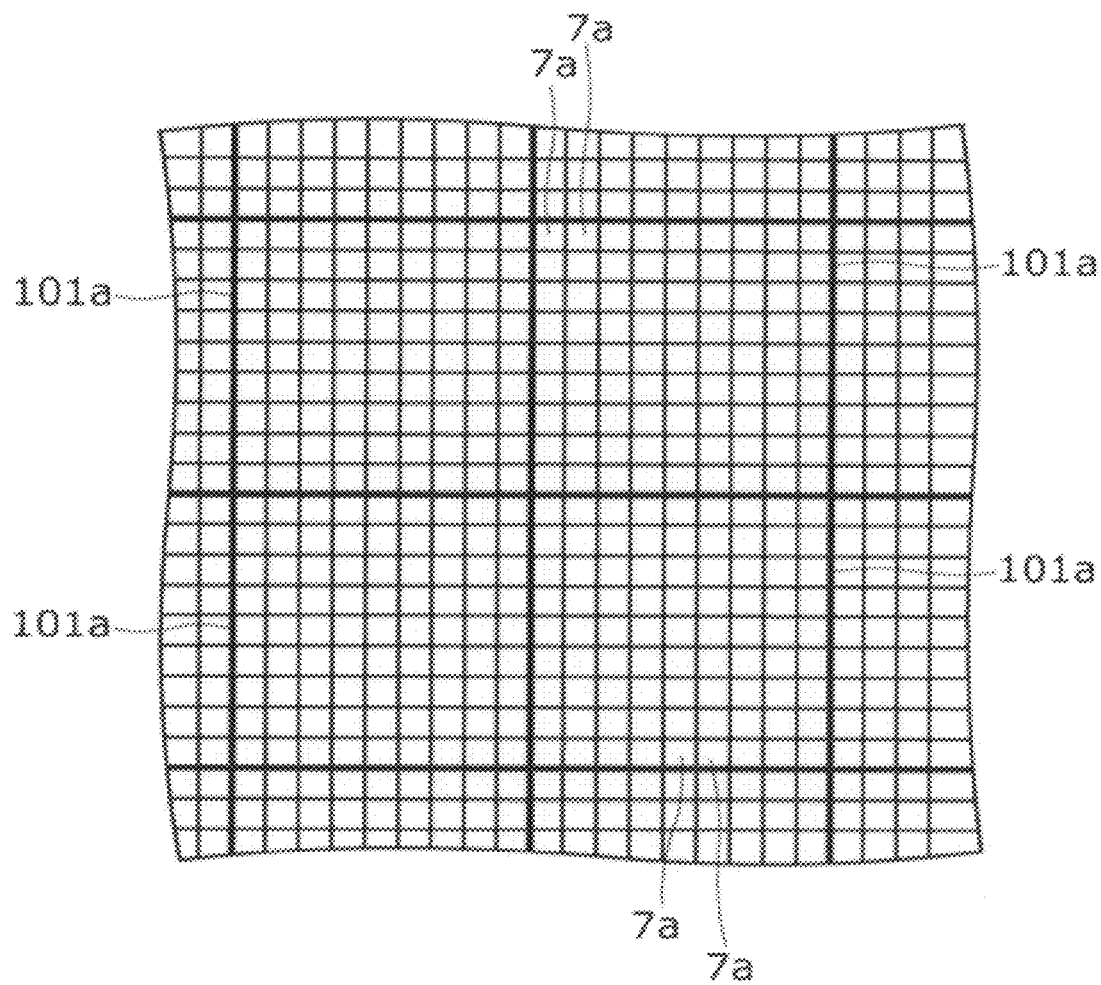
FIG. 6 illustrates how the image elements of a display panel projected on the imaging plane is related to the imaging components of a camera according to the first example.

FIG. 6 illustrates how the image elements of a display panel projected on the imaging plane is related to the imaging components of a camera.

As shown in FIG. 5, the unevenness inspection apparatus 11 according to this example comprises an imaging unit 2, a computing unit 3, a storage unit 4, and an input/output unit 5. The imaging unit 2 comprises a movable stage 6 for supporting a display panel 101, and a camera 7 for imaging the display panel 101. The movable stage 6 is illustratively implemented by a biaxial goniostage, which can control the posture of the display panel 101 along two axes independently.

The camera 7 is composed of a CCD (charge-coupled device) or other imaging device (not shown) having a plurality of periodically arranged imaging components, and an optical system (not shown) for focusing light on the imaging device. The arrangement density of imaging components in the imaging device of the camera 7 is greater than the arrangement density of image elements of the display panel 101 in the image of the display panel 101 projected on the imaging plane of the camera 7. Thus the camera 7 captures each image element of the display panel 101 by a plurality of imaging components to acquire a captured image. For example, as shown in FIG. 6, on the imaging plane of the camera 7, for an image of one image element 101a of the display panel 101, a total of 81 imaging components 7a of the camera 7 are arranged as a 9×9 matrix. Here the "image element" of a display panel refers to a basic display unit composed of a set of RGB pixels.

Furthermore, the computing unit 3 specifies regions each including a plurality of consecutively arranged pixels in the captured image so that the position and area of each region are randomized in a prescribed range. The computing unit 3 combines a plurality of pixels included in the respective regions to form one pixel, thereby creating a primary image.

The configuration of the unevenness inspection apparatus 11 other than the foregoing is the same as the configuration of the unevenness inspection apparatus 1 shown in FIG. 1.

Next, a description is given of the operation of the unevenness inspection apparatus according to this example, that is, an unevenness inspection method according to this example.

Figure 7:
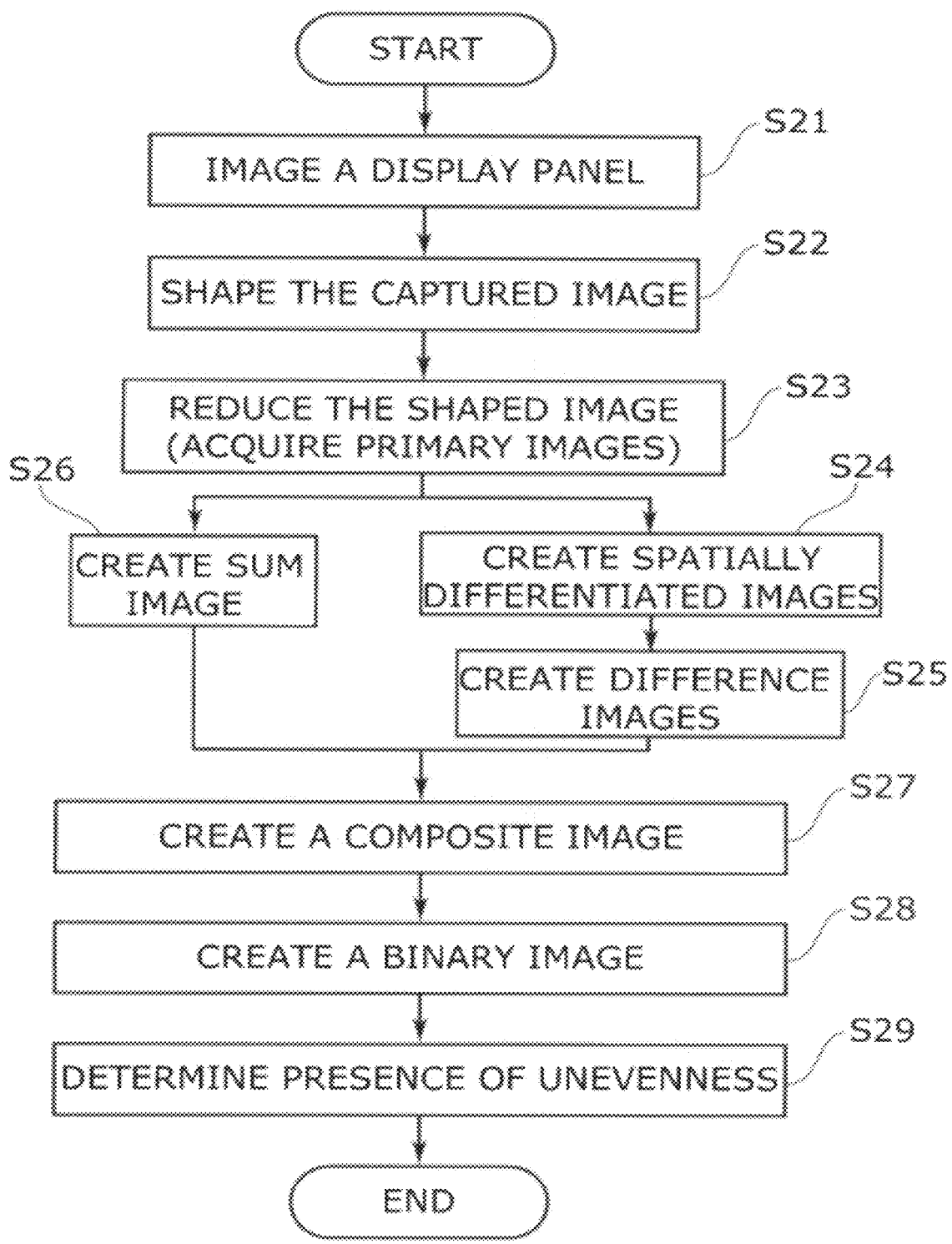
FIG. 7 is a flow chart illustrating an unevenness inspection method according to the first example.

FIG. 7 is a flow chart illustrating an unevenness inspection method according to this example.

Figure 8:
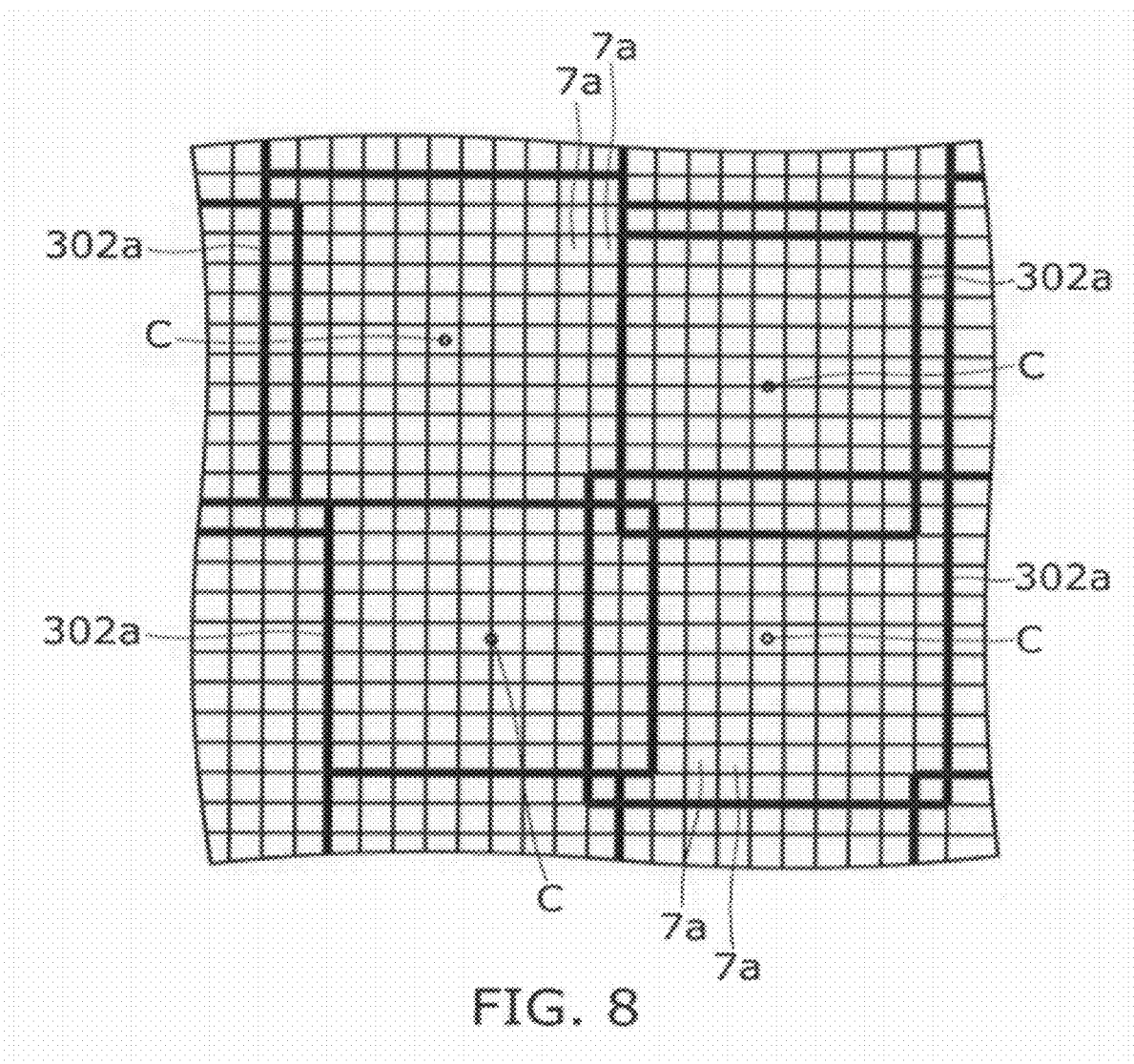
FIG. 8 illustrates the relationship between the image elements of the display panel and a composite unit region.

FIG. 8 illustrates the relationship between the image elements of the display panel and a composite unit region.

Figure 9:
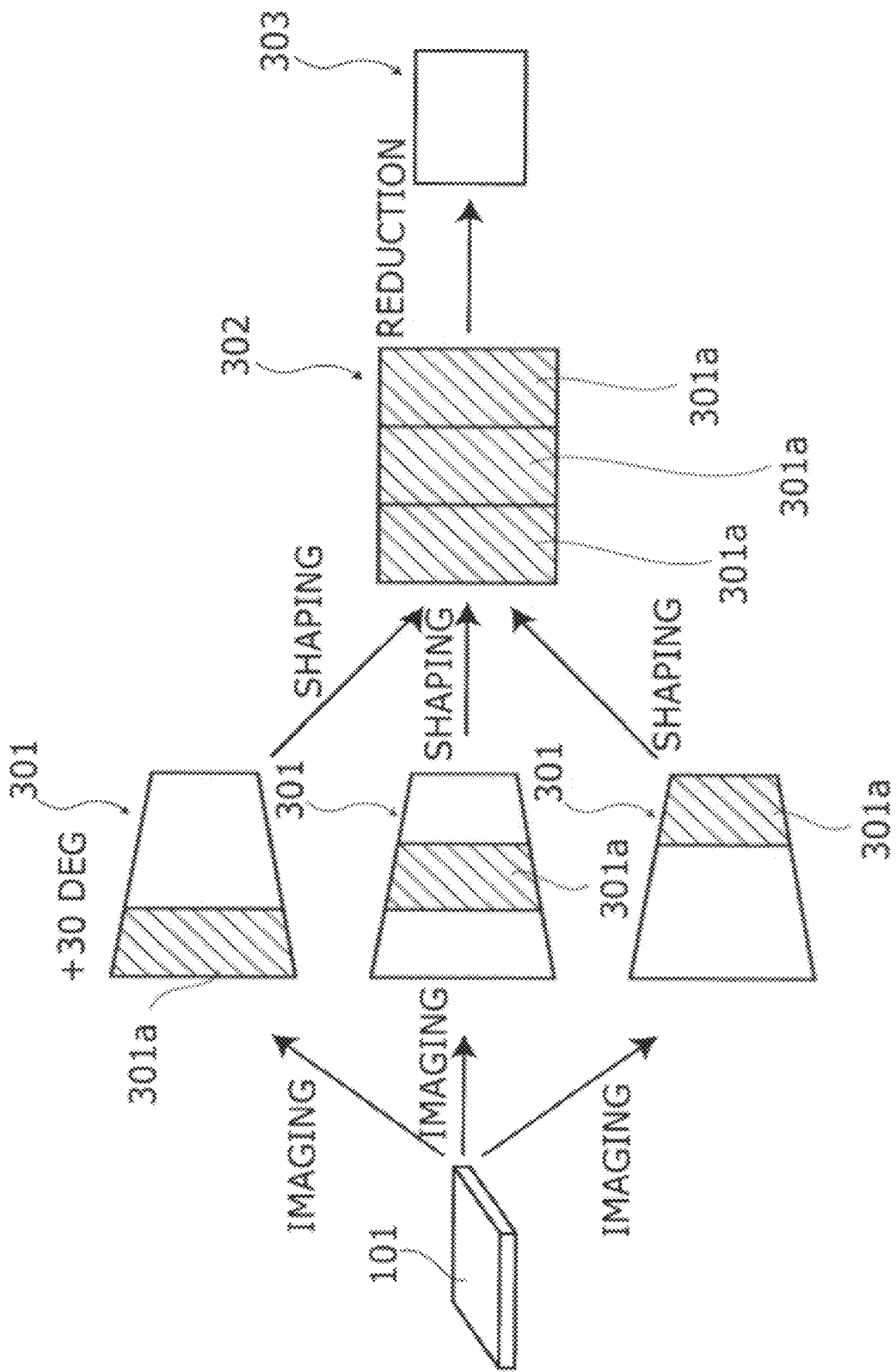
FIG. 9 illustrates a flow of image information in the unevenness inspection method according to the first example.
Figure 10:
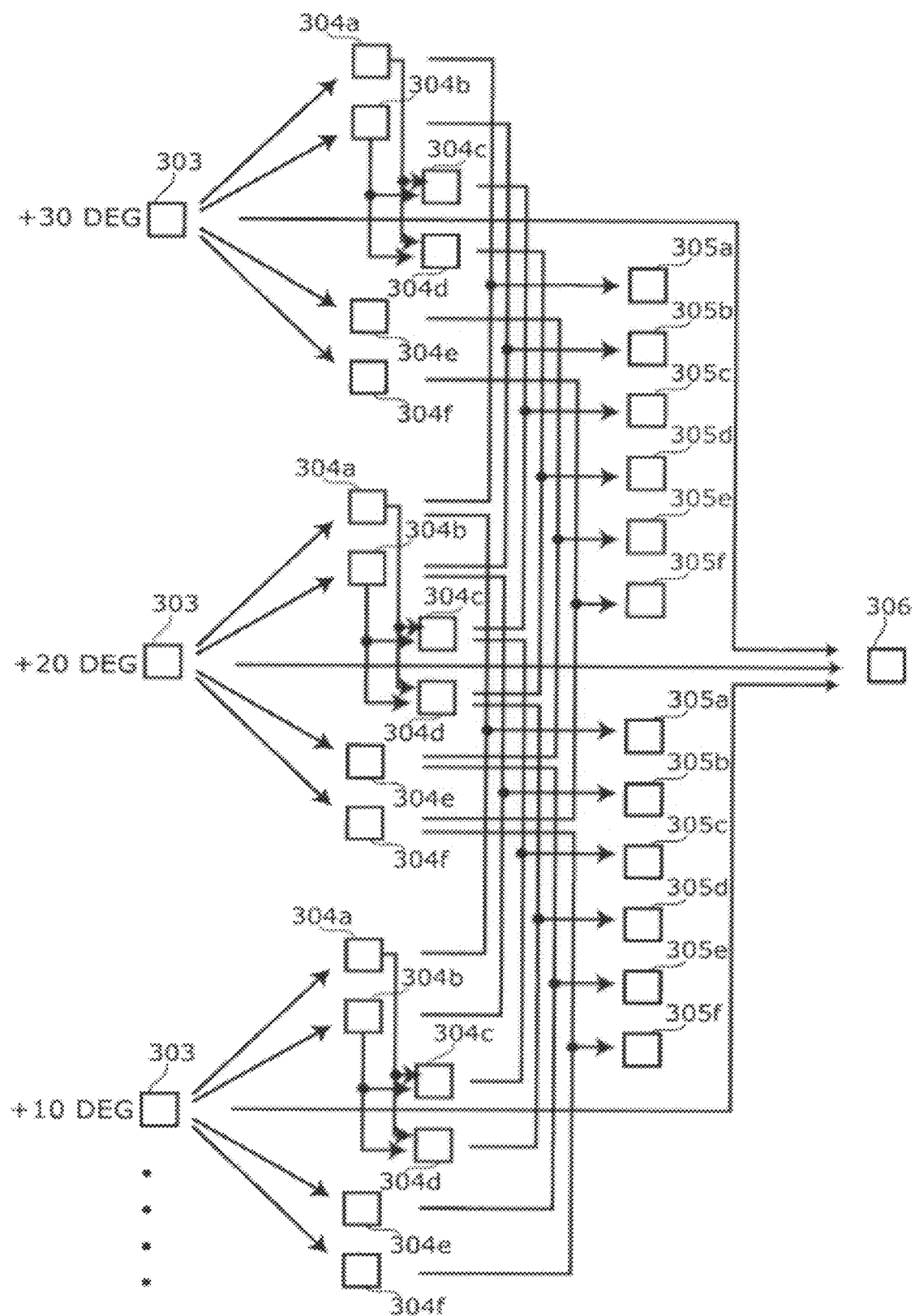
FIG. 10 illustrates a flow of image information in the unevenness inspection method according to the first example.

FIGS. 9 and 10 illustrate a flow of image information in the unevenness inspection method according to this example. In FIGS. 9 and 10, only some of the levels are shown for simplicity.

Figure 11A:
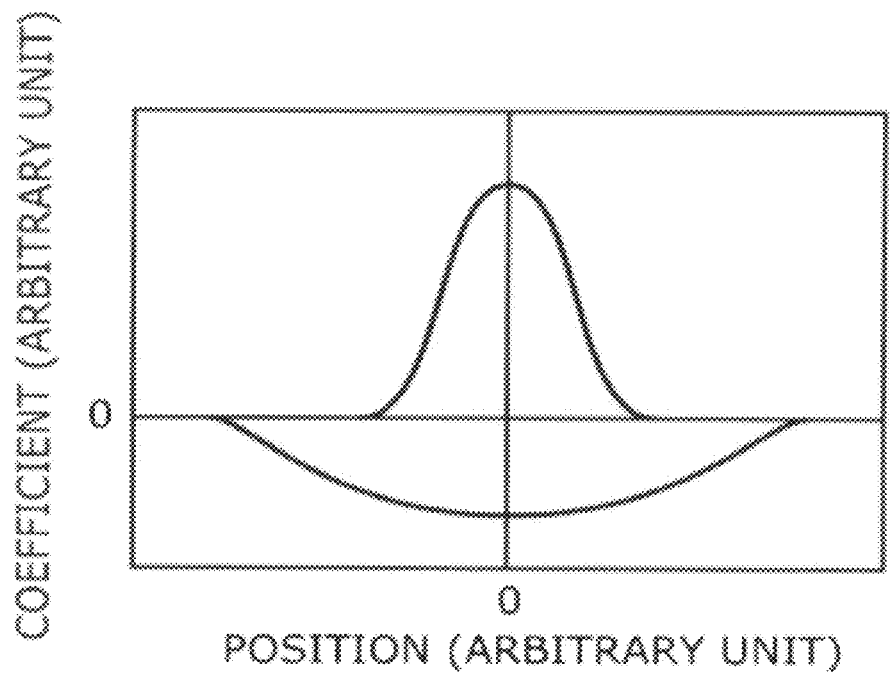
FIGS. 11A and 11B are graphs illustrating spatial differentiation filters where the horizontal axis represents position on the image and the vertical axis represents the coefficient.
Figure 11B:
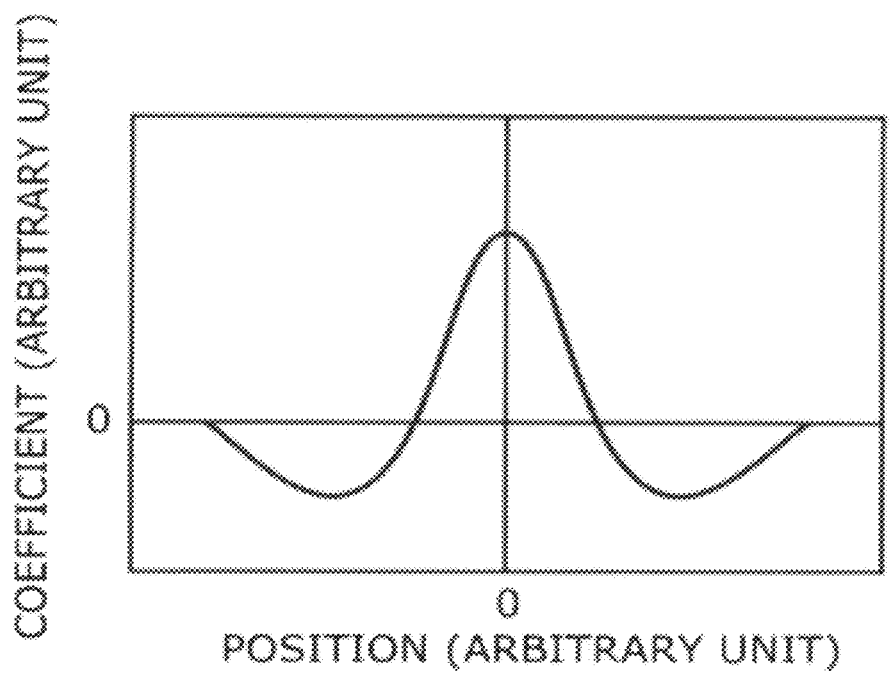

FIGS. 11A and 11B are graphs illustrating spatial differentiation filters where the horizontal axis represents position on the image and the vertical axis represents the coefficient. FIG. 11A shows a filter formed by combination of two, positive and negative, Gaussian functions. FIG. 11B shows a filter expressed by one function equivalent to that of FIG. 11A.

Figure 12:
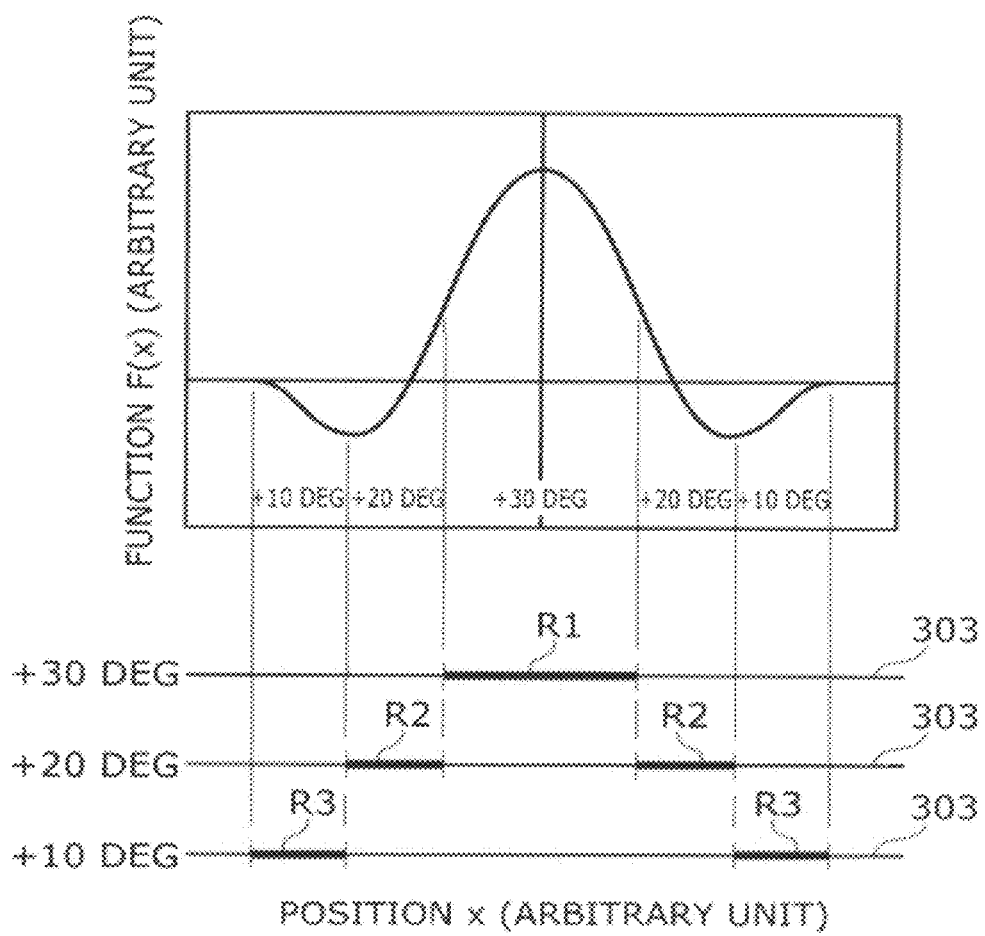
FIG. 12 illustrates a method for creating a sum image where the horizontal axis represents position on the image and the vertical axis represents the coefficient.

FIG. 12 illustrates a method for creating a sum image where the horizontal axis represents position on the image and the vertical axis represents the coefficient.

Figure 13A:
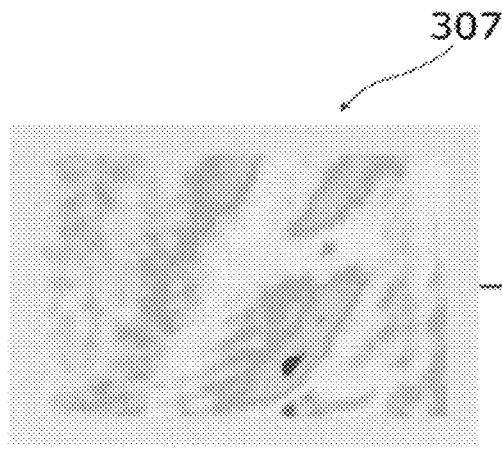
FIGS. 13A to 13D illustrate composite images and binary images, where
Figure 13B:
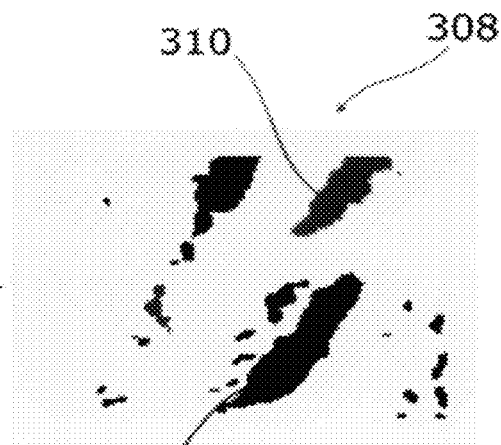
Figure 13C:
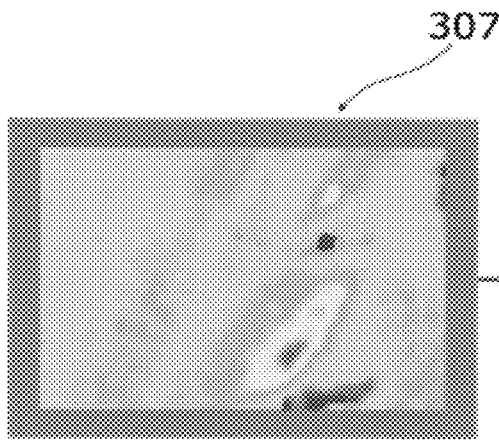
Figure 13D:
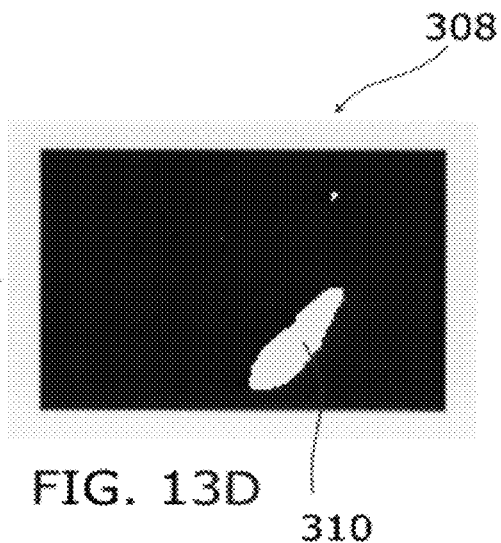

FIGS. 13A to 13D illustrate composite images and binary images, where FIG. 13A shows a composite image, FIG. 13B shows a binary image obtained by binarizing the composite image shown in FIG. 13A, FIG. 13C shows another composite image, and FIG. 13D shows a binary image obtained by binarizing the composite image shown in FIG. 13C.

Figure 14A:
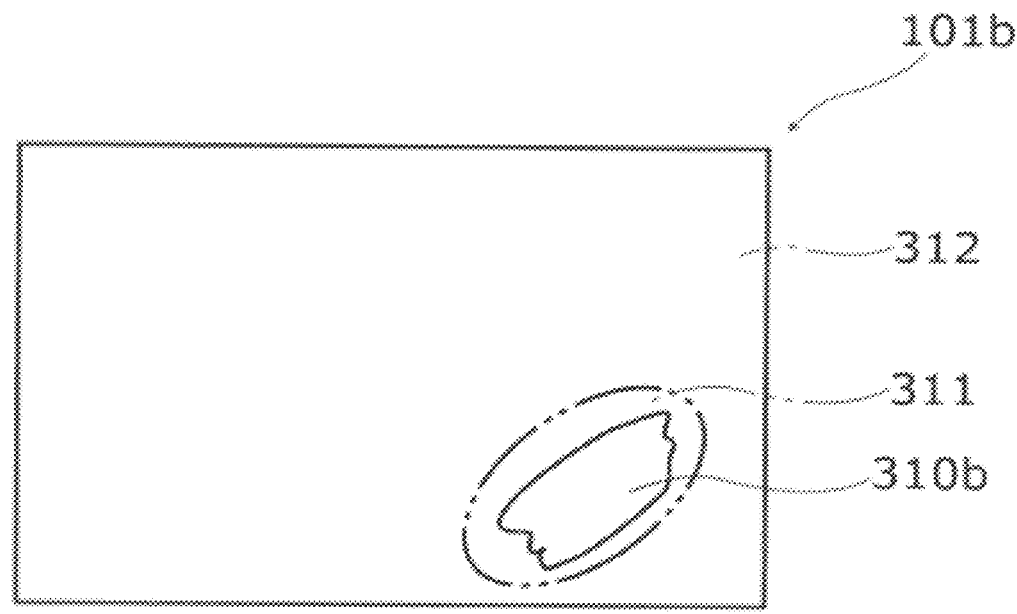
FIG. 14A illustrates a training panel.
Figure 14B:
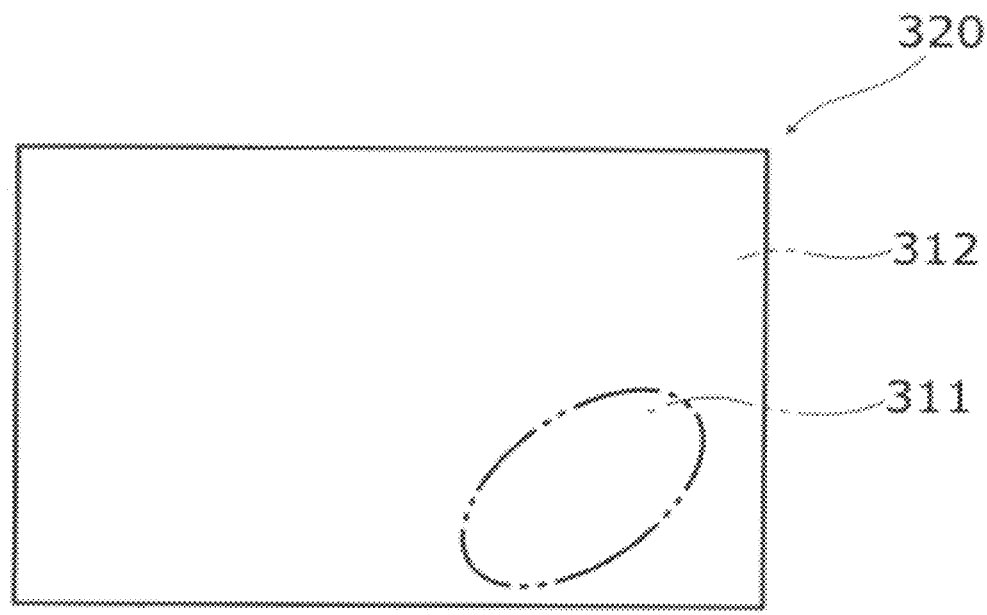
FIG. 14B illustrates a mask corresponding to the training panel shown in FIG. 14A.

FIG. 14A illustrates a training panel, and FIG. 14B illustrates a mask corresponding to the training panel shown in FIG. 14A.

A description is given below with reference to FIGS. 5 to 14.

First, a "weighting parameter set" representing weighting for use in combining secondary images is stored beforehand in the storage unit 4 (see FIG. 5). A specific method for determining the weighting parameter set will be described later. With the weighting parameter set stored in the storage unit 4, a subject display panel 101 is inspected.

As shown in step S21 of FIG. 7, the movable stage 6 is first driven with the display panel 101 held thereon, and the camera 7 images the display panel 101. Thus the display panel 101 is imaged with the imaging angle varied. For example, while the imaging angle is varied in the range of −30 to +30 degrees, imaging is performed at nine levels of imaging angle, that is, −30, −20, −10, −5, 0, +5, +10, +20, and +30 degrees to acquire a captured image 301. The captured image 301 is outputted to the computing unit 3. The "imaging angle" refers to the angle between the line connecting the center of the display panel 101 to the camera 7 and the normal to the surface of the display panel 101.

As shown in FIG. 9, when all the regions of the display panel 101 cannot be simultaneously brought into focus because of large imaging angle, a plurality of captured images are acquired with different focus positions for one level of imaging angle so that each region of the display panel 101 is covered with the in-focus region 301a in any of the captured images. FIG. 9 shows the case where three captured images are acquired at an imaging angle of +30 degrees.

Here, as shown in FIG. 6, each image element 101a of the display panel 101 is imaged by 81 imaging components 7a illustratively arranged as a 9×9 matrix. Thus the imaging condition satisfies the sampling theorem, and the captured image 301 is free from moire due to interference between the arrangement period of the image elements 101a and the arrangement period of the imaging components 7a.

Next, as shown in step S22, the computing unit 3 shapes the captured image 301 by geometrical correction. More specifically, the captured image 301 has distortion due to the difference of distance between the camera 7 and each portion of the display panel 101. For this reason, the image is normalized by shaping the captured image 301 into a certain configuration, e.g., a rectangle similar to the configuration of the display panel 101. Here, when a plurality of captured images are acquired with different focus positions for one level in the imaging process shown in step S21, only the in-focus regions 301a (see FIG. 9) of the respective captured images are combined into one image, which is then shaped. Thus a shaped image 302 is acquired.

The shaped image has higher resolution than the image elements of the display panel, and even the structure of each image element is imaged. Thus it is unsuitable to extraction of macroscopic defects such as unevenness. Furthermore, the captured image has a large data size and is inconvenient to handle. Thus, as shown in step S23, the shaped image 302 is reduced. Specifically, an average of 81 imaged pixels 7a consecutively arranged on average as a 9×9 matrix are combined into one pixel to reduce the image resolution, so that one pixel of the reduced image corresponds to approximately one image element 101a of the display panel 101.

However, if the shaped image 302 is uniformly reduced, moire occurs in the reduced image. For this reason, as shown in FIG. 8, the area and the position of the center C of a region in the unreduced image to be reduced to one pixel (hereinafter referred to as "composite unit region 302a"), is specified randomly in a prescribed range. For example, the area of a composite unit region is specified randomly in a range from approximately 9×9 to 11×11 pixel region, and the position of the center C is specified randomly in a range of approximately one pixel on the left, right, top, and bottom of the reference position. Furthermore, reduction of the shaped image is weighted by a Gauss function, the coefficients of which are also randomly specified.

Specifically, let N denote the image reduction ratio, let p(x,y) denote the pixel value of a pixel located at coordinates (x,y) in the reduced image, let P(X,Y) denote the pixel value of a pixel located at coordinates (X,Y) in the original image before reduction, let W(i,j) denote a weighting function for a pixel located at coordinates (i,j) in each image unit region of the original image, and let rnd1, rnd2, and rnd3 denote random numbers taking random values in the range from −1 to +1. Then the pixel value p(x,y) in the reduced image is calculated by the following formulas 1 and 2:

$$p(x, y) = \frac{\sum_{j=0}^{3N-1} \sum_{i=0}^{3N-1} W(i, j) \times P(Nx + i, Ny + j)}{\sum_{j=0}^{3N-1} \sum_{i=0}^{3N-1} W(i, j)} \quad (1)$$

$$W(i, j) = \exp\left[-\frac{\left(i + \frac{N}{2} \times rnd1\right)^2 + \left(j + \frac{N}{2} \times rnd2\right)^2}{2 \times (3N + rnd3)}\right] \quad (2)$$

The image thus reduced is subjected to such processes as contrast enhancement, as needed. Thus a primary image 303 is acquired.

Next, as shown in FIG. 10 and step S24 of FIG. 7, the primary image 303 is spatially differentiated to create a spatially differentiated image 304. Specifically, a filter formed by combination of two, positive and negative, Gaussian functions as shown in FIG. 11A is applied to each primary image 303. That is, multidimensional filtering with multiple kernel sizes is applied to the primary image 303. In this filter, the negative Gaussian function is broader and has a smaller absolute value of peak height than the positive Gaussian function. Thus the spatially differentiated image 304 is an image with the spatial variation of the primary image 303 enhanced. For example, two types of spatially differentiated images 304a and 304b with the Gaussian function varied in shape are created from one primary image 303. Furthermore, the spatially differentiated image 304b is subtracted from the spatially differentiated image 304a to create a difference image (spatially differentiated image 304c), and the spatially differentiated image 304a is subtracted from the spatially differentiated image 304b to create a difference image (spatially differentiated image 304d).

As shown in FIG. 11B, two types of filters, each made of one function nearly equivalent to the filter composed of two Gaussian functions shown in FIG. 11A, are prepared and applied to the primary image 303 to create spatially differentiated images 304e and 304f, respectively. Thus six spatially differentiated images 304 are created from one primary image 303.

Next, as shown in step S25, one difference image 305 is created from two spatially differentiated images 304 created by the same type of filter with the imaging angle shifted by one level. For example, as shown in FIG. 10, the spatially differentiated image 304a having an imaging angle of +20 degrees is subtracted from the spatially differentiated image 304a having an imaging angle of +30 degrees to create a difference image 305a. Furthermore, the spatially differentiated image 304b having an imaging angle of +20 degrees is subtracted from the spatially differentiated image 304b having an imaging angle of +30 degrees to create a difference image 305b. Likewise, the spatially differentiated images 304c to 304f having an imaging angle of +20 degrees are subtracted from the spatially differentiated images 304c to 304f having an imaging angle of +30 degrees to create difference images 305c to 305f, respectively. Moreover, difference images 305 are created likewise for other imaging angles. The difference image 305 is an image with image variation due to the variation of imaging angle enhanced.

On the other hand, as shown in step S26, besides the processes shown in steps S24 and S25, one sum image 306 is created on the basis of three primary images 303 captured at consecutive levels of imaging angle. Specifically, as shown in FIG. 12, for example, a function F(x) having one maximal and two minimals across this maximal is applied to the three primary images. More specifically, the sum of the following values (1) to (3) is set to the pixel value of one pixel (hereinafter referred to as "particular pixel") of the sum image 306:

(1) The pixel value of a region R1 (particular region) including a pixel corresponding to the particular pixel in the primary image 303 having an imaging angle of +30 degrees, the pixel value being multiplied by the function F(x).

(2) The pixel value of a region R2 sandwiching the region R1 in the primary image 303 having an imaging angle of +20 degrees, the pixel value being multiplied by the function F(x).

(3) The pixel value of a region R3 sandwiching the regions R1 and R2 in the primary image 303 having an imaging angle of +10 degrees, the pixel value being multiplied by the function F(x).

Here, the number of pixels included in each of the regions R1 to R3 is arbitrary.

The sum image 306 is created by repeating the above calculation with each pixel in the sum image 306 taken as a particular pixel. The sum image 306 is an image with both the image variation due to the variation of imaging angle and the spatial image variation enhanced.

Next, as shown in step S27, all the secondary images, that is, the spatially differentiated images 304, the difference images 305, and the sum images 306 are combined into a composite image 307. In the case where the imaging angle has nine levels, there are 54 spatially differentiated images 304 (9 levels×6 images), 48 difference images 305 (8 levels×6 images), and 7 sum images 306 (7 levels). Hence a total of 109 secondary images are combined into one composite image 307. Furthermore, when any conditions other than imaging angle are varied in imaging, the secondary images resulting from the captured images for these conditions are also included in the combining process. Here, the "weighting parameter set" in combining secondary images is the weighting parameter set stored in the storage unit 4 (see FIG. 5), that is, the weighting parameter set specified for each type of unevenness to be detected. Thus a composite image is formed for each type of unevenness.

Next, as shown in FIG. 13 and step S28, the composite image 307 is binarized with a prescribed threshold to form a binary image 308, and the presence of unevenness is identified. More specifically, the composite image 307 as shown in FIGS. 13A and 13B is binarized with a prescribed threshold to form a binary image 308 as shown in FIGS. 13C and 13D, respectively, and the presence of unevenness 310 is identified.

Next, as shown in step S29, the presence of unevenness is determined on the basis of this identification result. More specifically, when only one type of unevenness is known, the identification result in step S28 is directly used as a determination result. On the other hand, when a plurality of types of unevenness are known and a plurality of composite images 307 are created, then a plurality of binary images 308 are created and OR operation is applied thereto. If the occurrence of unevenness is identified in at least one of the composite images 307, it is determined as "unevenness-bearing". However, if the occurrence of unevenness is not identified in any composite images 307, it is determined as "unevenness-free". Here, the degree of unevenness may be ranked according to the area of unevenness. Alternatively, a plurality of binary images may be formed using different thresholds for each composite image 307, and the degree of unevenness may be ranked according to the gradation difference between the unevenness and its surroundings.

In the following, a method for determining a weighting parameter set is described. First, as shown in FIG. 14A, a display panel, which is determined to have unevenness by a human inspector, is prepared and used as a training panel 101b. In the training panel 101b, a region 311 having unevenness 310b is identified. The region other than the region 311 in the training panel 101b is referred to as region 312.

Next, as shown in FIG. 14B, a mask 320 is prepared, which is a mask corresponding to the training panel 101b and being capable of distinguishing between the region 311 and the region 312. If a plurality of training panels 101b have been prepared for the same type of unevenness, a plurality of masks 320 corresponding to the respective training panels 101b are prepared.

Next, the training panel 101b is subjected to the processes shown in steps S21 to S26 of FIG. 7 to create a plurality of secondary images. Next, a composite image is created with arbitrary initial values set to the weighting parameter set. Next, the mask 320 is applied to this composite image to find the brightness entropy of the region 311 and the brightness entropy of the region 312. Here, if there are a plurality of training panels 101b, data for all the training panels 101b are summed to find one value for each of the entropy of the region 311 and the entropy of the region 312.

In general, a region of an image with violent image variation has large brightness variation, and a histogram representing occurrence probability for each brightness has a dispersed distribution of occurrence probability. Then the brightness entropy of this region increases. The entropy $H_f$ is given by the following formula 3:

$$H_f = \sum_{f=0}^{L-1} P(f)\log_2 \frac{1}{P(f)} \quad (3)$$

where f is brightness, P(f) is the occurrence probability of brightness f, and L is the number of gradations of brightness f.

The entropy thus found is used to find the ratio of the brightness entropy of the region 311 (region with unevenness) to the brightness entropy of the region 312 (region without unevenness). This ratio is hereinafter referred to as "entropy ratio". The entropy ratio can be expressed by the following formula:

Entropy ratio=(Entropy of unevenness-bearing region)/(Entropy of unevenness-free region)

Next, by convergence calculation, the value of each parameter constituting the weighting parameter set is adjusted so as to maximize the entropy ratio. Specifically, one parameter is selected from the weighting parameter set, and the values of parameters other than this parameter are fixed. Then the value of the one parameter is varied from the present value to a value increased by a certain quantity and to a value decreased by a certain quantity. Among these three values, the value maximizing the entropy ratio is taken as a new value of this parameter. This operation is repeated, and the value of this parameter is temporarily fixed when the entropy ratio is locally maximized.

Next, another parameter is selected and subjected to the same operation. The value of this other parameter is adjusted so as to locally maximize the entropy ratio. This adjustment is performed for every parameter. Adjustment for all the parameters is repeated until the entropy ratio converges to a certain value. Thus the weighting parameter set locally maximizing the entropy ratio can be determined. Then the weighting parameter set thus determined is stored in the storage unit 4. If there are a plurality of types of unevenness, the weighting parameter set is determined for each type of unevenness.

In this manner, the weighting parameter set is determined so that a region having unevenness can be distinguished from the other region in a composite image created by combination of a plurality of secondary images resulting from a training panel material having unevenness.

Next, the effect of this example is described.

In this example, in the processes shown in steps S24 to S26 of FIG. 7, primary images are used to create secondary images, which include spatially differentiated images with spatial image variation enhanced, difference images with image variation due to the variation of imaging angle enhanced, and sum images with both the image variation due to the variation of imaging angle and the spatial image variation enhanced. These processes are similar to processes occurring in human vision. This point is described below in detail.

The human retina includes "amacrine cells", which receive signals from visual cells. It is known that the "amacrine cells" include cells enhancing the spatial variation of vision, cells enhancing its temporal variation, and cells enhancing its spatiotemporal variation. For this reason, a human can easily recognize objects with spatial, temporal, and spatiotemporal variation. Hence such function of amacrine cells presumably enables a human inspector visually inspecting display panels to detect defects that are difficult to detect by conventional unevenness inspection apparatuses. For example, a human inspector recognizes that the tone of a region in a display panel is subtly different from the tone of the adjacent region with the support of cells enhancing spatial variation, and can presumably determine it to be unevenness. Furthermore, when a human inspector observes a display panel with varying the angle of the display panel, the inspector can presumably detect unevenness that can be visually identified only at a certain angle of sight with the support of cells enhancing temporal or spatiotemporal variation.

Thus the present example is intended to obtain a result close to human sensory test by simulating such support function of human vision. More specifically, the function of enhancing spatial variation by amacrine cells is simulated in this example by creating spatially differentiated images from primary images to enhance spatial variation as shown in step S24.

Furthermore, the function of enhancing temporal and spatiotemporal variation of vision by amacrine cells during observation by a human inspector with the angle of a display panel being varied is simulated in this example by forming difference images and sum images from primary images captured at different imaging angles to replace the variation of human vision along the time axis by the variation along the imaging angle axis as shown in step S25 and S26. That is, when a human inspector makes observation with varying the angle of a display panel, the time axis and the angle axis (condition axis) are oriented in the same direction, and the inspector's vision enhances variation along the time axis. On the other hand, the unevenness inspection apparatus of this example achieves an effect similar to the inspector's vision by image processing that enhances variation along the angle axis.

In this example, a description is given of the variation of imaging angle, which is illustratively taken as an example of imaging conditions. However, this embodiment is not limited thereto. For example, a display panel may have a type of unevenness which occurs only during emission of green light from the display panel and does not occur during emission of the other colors and during no light emission. Such unevenness is difficult to inspect for a human inspector when the display panel is caused to emit only green light. However, if the color of light emission of the display panel is gradually varied with time, the unevenness can be easily detected when the color of light emission becomes green. Presumably, this is attributed to the function of cells enhancing the temporal variation of vision. According to this embodiment, the tone of a test pattern displayed on the display panel under inspection is provided with a plurality of levels, and the display panel is imaged for each level. Thus the sensory test as described above can be simulated.

In this example, the weighting parameter set used in creating a composite image from secondary images is determined so that the region determined to have unevenness by a human inspector is also determined to have unevenness by this inspection method and that the region determined to have no unevenness by a human inspector is also determined to have no unevenness by this inspection method. That is, the weighting parameter set is adjusted to sensory test in its determination.

Thus, for example, unevenness that is recognizable only at a particular imaging angle can be reliably detected by highly weighting the imaging angle at which the unevenness occurs. Furthermore, abnormal regions in the image caused by emission variations of the display panel or by reflection of illumination light for inspection, which a human inspector could clearly identify as not being unevenness, can be removed from the composite image. Moreover, by thus determining the weighting parameter set, the inspection result can be made closer to the result of sensory test. In general, a beginner in unevenness inspection fails to detect unevenness, but gradually learns to detect unevenness by accumulating experience in unevenness inspection. This is presumably because learning by the human brain optimizes visual information and facilitates detection of unevenness. In the present example, the weighting parameter set can be determined as described above to simulate human brain plasticity, thereby introducing the learning outcome of experienced inspectors.

Furthermore, in the present example, in imaging a display panel, each image element of the display panel is imaged by a plurality of imaging components. In the captured image thus acquired, a plurality of pixels residing in a composite unit region is combined into one pixel to create a primary image having lower resolution than the captured image. Here, the position and area of each composite unit region and the weighting of each pixel are configured randomly in a prescribed range by the above formulas 1 and 2. Thus the periodicity of the image is destroyed by performing random sampling in creating primary images from the captured image, and hence moire can be prevented. Furthermore, by reducing the resolution of the primary image, it is possible to reduce the amount of computation in the subsequent processes and to improve the processing speed.

In the present example, a movable stage 6 is illustratively provided in the imaging unit 2 for controlling the imaging angle. However, the camera 7 may be moved with the display panel 101 fixed. The levels of imaging angle are not limited to the above example, but may be varied along two axes, for example. The above method for determining the weighting parameter set repeats correction for each parameter, starting from a certain initial value, in the direction of increasing the entropy ratio by convergence calculation, and thereby the parameter is allowed to converge to a certain value. Thus it is possible to find a weighting parameter set that locally maximizes the entropy ratio, but the local maximum is not always the global maximum. Hence, the parameter may converge to a different result for a different initial value. In this regard, it is possible to randomly set a plurality of initial values in convergence calculation and, among the convergence results, to adopt the result maximizing the entropy ratio. Alternatively, it is possible to use an algorithm less prone to falling into extrema such as genetic algorithms or annealing. Thus the risk of setting the weighting parameter set to inappropriate values can be avoided.

Next, a second example is described.

In the unevenness inspection apparatus according to this example, a telecentric camera (not shown) is attached to the camera 7 shown in FIG. 5. Thus the entire display panel can be brought into focus when the display panel 101 is imaged from an oblique direction. Furthermore, distortion of the captured image due to varied distance between the camera 7 and different portions of the display panel 101 can be prevented. Consequently, in the imaging process shown in step S21 of FIG. 7, only one captured image needs to be acquired even when it is captured at large imaging angle. Furthermore, in the shaping process shown in step S22, the shaping is easy or unnecessary. The configuration, operation, and effect in this example other than the foregoing are the same as those in the first example described above.

Next, a third example is described.

Figure 15:
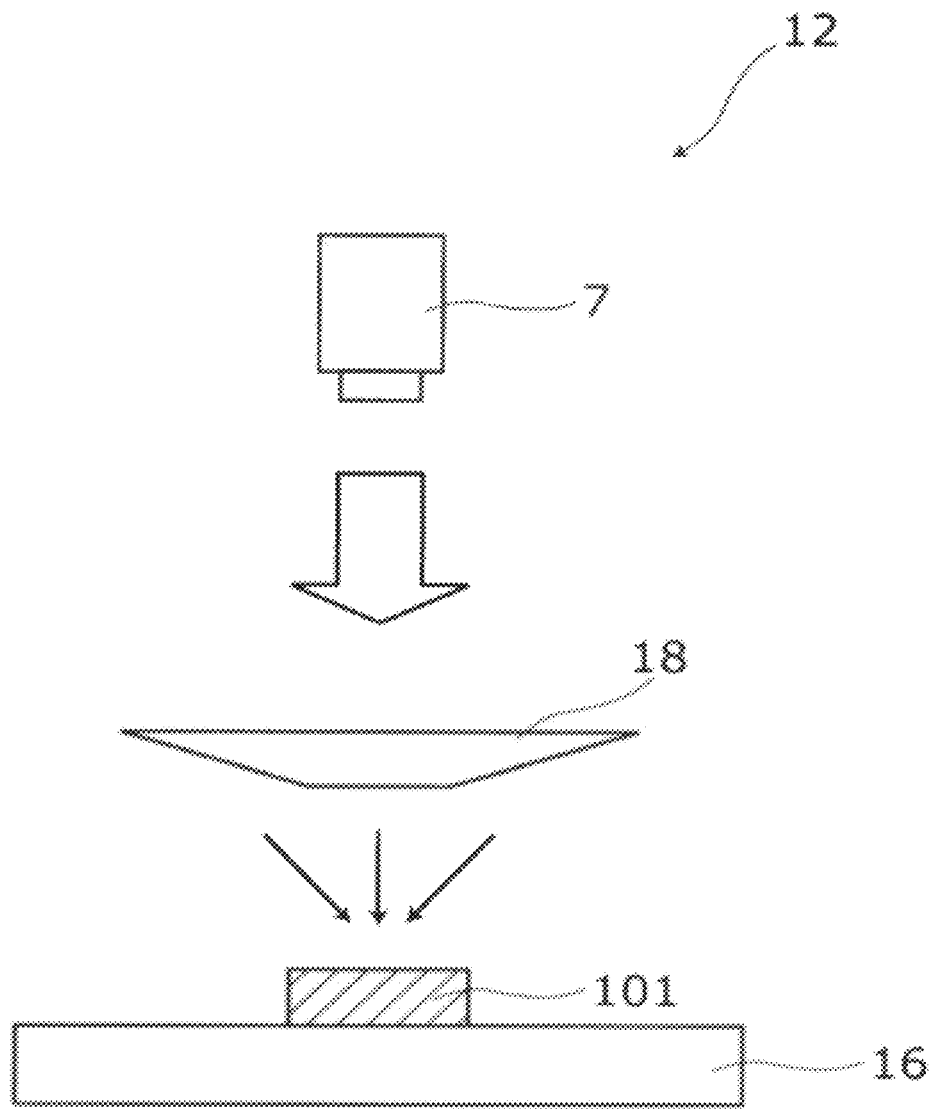
FIG. 15 shows an optical model illustrating the imaging unit of the unevenness inspection apparatus according to the third example.

FIG. 15 shows an optical model illustrating the imaging unit of the unevenness inspection apparatus according to this example.

Figure 16:
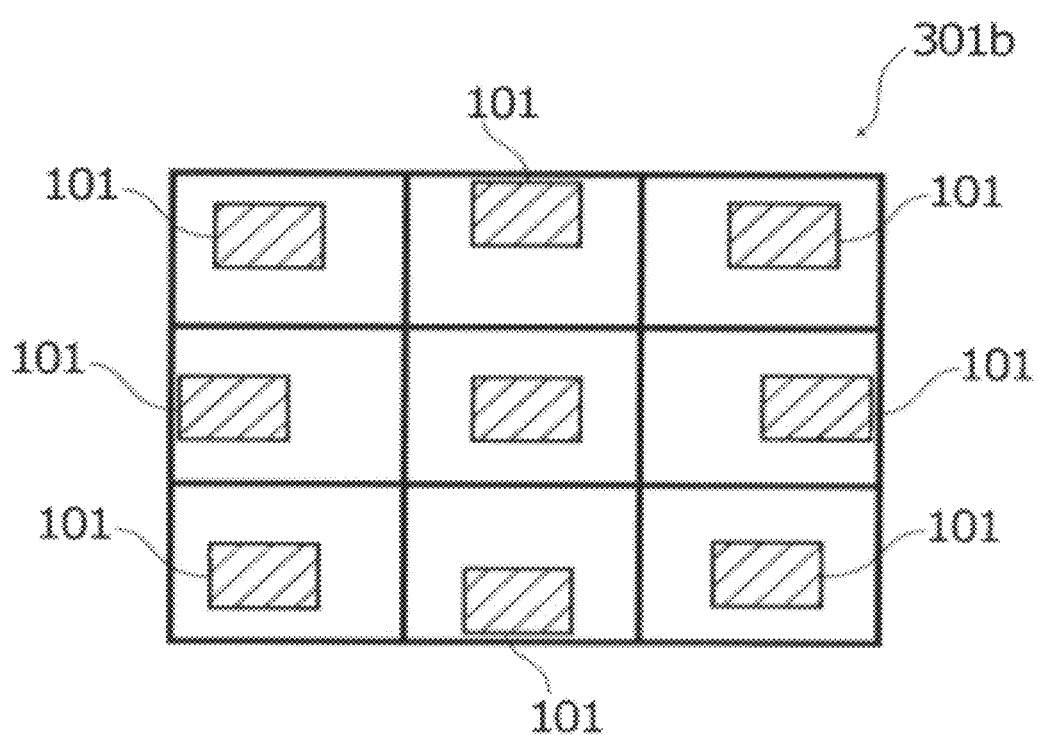
FIG. 16 illustrates a captured image obtained in the third example.

FIG. 16 illustrates a captured image obtained in this example.

As shown in FIG. 15, the imaging unit 12 of the unevenness inspection apparatus according to this example includes a multifaceted prism 18 intervening in the optical path from the camera 7 to the inspection target, or the display panel 101. For example, the multifaceted prism 18 is a plate-like transparent member partitioned in a 3×3 matrix on one side, each partitioned region being cut at a different angle.

The imaging unit 12 does not include the movable stage 6 (see FIG. 5), but instead includes a fixed stage 16.

As shown in FIG. 15, in this example, light beams emitted from the display panel 101 in nine different directions are refracted by passing through the multifaceted prism 18 and reach the camera 7 with their traveling directions being changed to the same direction. Thus, as shown in FIG. 16, the camera 7 can simultaneously image the display panel 101 from nine different directions. Consequently, the display panel 101 as viewed from the nine different directions is recorded in the captured image 301b.

According to this example, there is no need to repeat imaging with the posture of the display panel 101 varied as in the first example described above, but the display panel 101 can be imaged with a plurality of levels of imaging angle by one-shot imaging. Thus the time required for varying the imaging angle can be eliminated, and the inspection efficiency can be improved. Furthermore, because the movable stage is not needed, the cost of the inspection apparatus can be reduced. The configuration, operation, and effect in this example other than the foregoing are the same as those in the first example described above.

In addition, in this example, the multifaceted prism 18 is illustratively placed between the camera 7 and the display panel 101, but this embodiment is not limited thereto. For example, the multifaceted prism may be incorporated inside the camera, or one or more lenses constituting the camera may be shaped as multifaceted prism. Alternatively, a plurality of mirrors may be arranged to realize an optical function similar to that of multifaceted prism.

Next, a fourth example is described.

FIGS. 17A to 17F, 18A, and 18B are graphs illustrating the signal processing method in this example, where the horizontal axis represents position on the image or frequency, and the vertical axis represents signal intensity.

In this example, in the imaging process shown in step S21 of FIG. 7, the density of imaging components of the camera 7 on the imaging plane of the camera 7 is comparable to the image element density of the display panel 101, in contrast to the first example described above. That is, one image element of the display panel 101 is imaged by nearly one imaging component of the camera 7, and reduction of the shaped image as shown in step S23 is not performed. Instead, the shaped image created in step S22 is subjected to the signal processing described below.

FIGS. 17A and 17B illustrate signals of an image outputted by the display panel 101 under inspection. More specifically, in FIGS. 17A and 17B, the horizontal axis represent position on the image, and the vertical axis represents signal intensity. In FIG. 17A, the display panel is viewed from the front, that is, from the direction with an imaging angle of 0 degrees. In FIG. 17B, the display panel is viewed from the direction slanted 45 degrees from the front, that is, from the direction with an imaging angle of 45 degrees.

This display panel is imaged by the camera (step S21), and the image is shaped (step S22). The signal of the shaped image is as shown in FIGS. 17C and 17D. The shaped image includes moire due to interference between the arrangement period of the image elements of the display panel and the arrangement period of the imaging components of the camera. If left unchanged, it is difficult to perform unevenness inspection.

Thus, as shown in FIGS. 17E and 17F, FFT (fast Fourier transform) is applied to this signal for conversion from the signal in the space domain to the signal in the frequency domain. Let $f_C$ be the arrangement frequency of imaging components (e.g. CCD) in the camera, $f_D$ the arrangement frequency of image elements of the display panel (e.g. LCD) in the projection plane of the camera, and $f_S$ the spatial frequency of unevenness occurring in the display panel. Then the spatial frequency of moire and unevenness varies as shown in the following TABLE 1 for an imaging angle of 0 and 45 degrees.

TABLE 1

|  |  | Frequency | |
| --- | --- | --- | --- |
|  |  | Moire | Unevenness |
| Imaging angle | 0 deg | $\|f_D - f_C\|$ | $f_S$ |
|  | 45 deg | $\|2f_D - f_C\|$ | $2f_S$ |

As shown in TABLE 1, as the imaging angle varies, the frequency of moire and the frequency of unevenness vary with different behaviors. In particular, when the arrangement frequency of imaging components $f_C$ is sufficiently close to the frequency $f_D$ determined by the arrangement of image elements relative to the frequency of unevenness $f_S$, the difference in the frequency variation associated with the variation of imaging angle becomes prominent. Thus, as shown in FIGS. 17E and 17F, the frequency components of moire can be identified in the signal in the frequency domain.

Figure 18A:
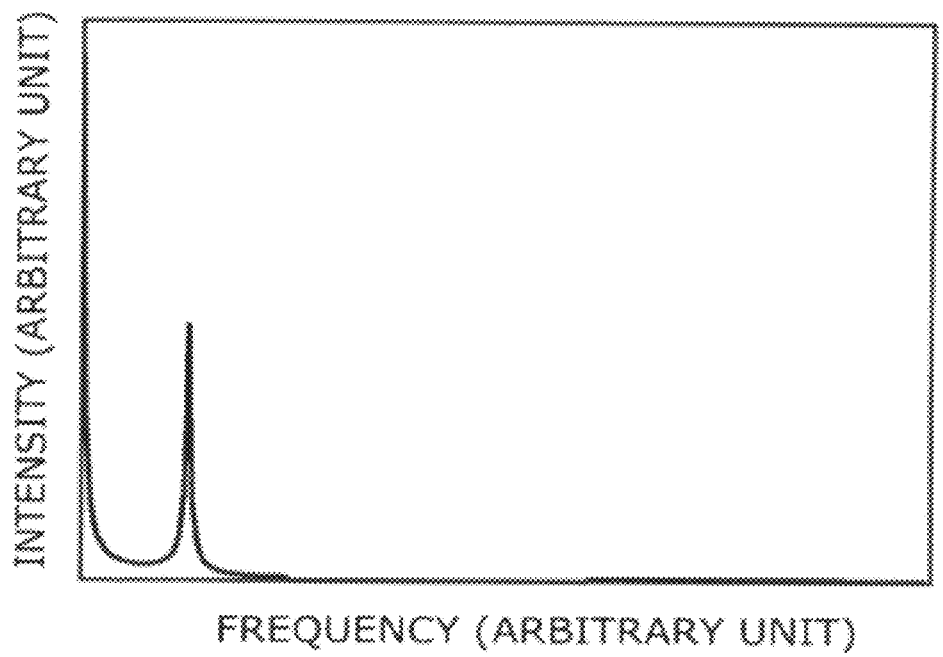
FIGS. 18A and 18B are graphs illustrating the signal processing method in the fourth example, where the horizontal axis represents position on the image or frequency, and the vertical axis represents signal intensity.
Figure 18B:
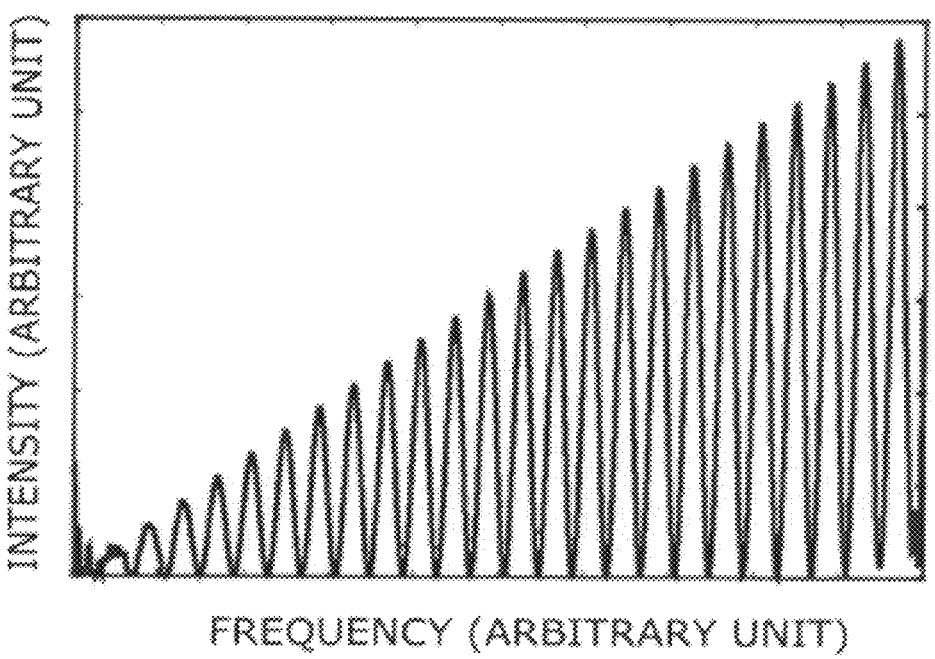

Then the frequency components of moire are removed from the signal shown in FIGS. 17E and 17F. Thus the signal shown in FIG. 18A can be obtained. Next, inverse FFT is applied to the signal shown in FIG. 18A for conversion from the signal in the frequency domain to the signal in the space domain. Thus a signal in the space domain as shown in FIG. 18B can be obtained. By the foregoing process, moire can be removed from the captured image. The resulting image is used as a primary image. Subsequently, the processes shown in step S24 and the following steps of FIG. 7 are performed.

According to this example, as compared with the first example described above, the camera resolution can be decreased, and the cost of the unevenness inspection apparatus can be reduced. Furthermore, the processing speed can be improved because the amount of data handled in the shaping process (step S22) is reduced. The configuration, operation, and effect in this example other than the foregoing are the same as those in the first example described above.

Next, a fifth example is described.

Besides unevenness under inspection, a region with nonuniform brightness distribution (hereinafter referred to as "pseudo unevenness") may also occur in the captured image acquired by imaging. Such pseudo unevenness includes that due to the optical design of the display panel and that due to the optical characteristics of the imaging unit. Pseudo unevenness due to the optical design of the display panel is attributed to nonuniformity of the spreader plate, deflection of the emitting direction of light traveling from the light guide plate toward the liquid crystal panel, and viewing angle of the liquid crystal panel, for example. When such pseudo unevenness occurs, it is necessary to distinguish between pseudo unevenness and unevenness to be inspected for accurately detecting the unevenness to be inspected.

Thus, in this example, a reference image including pseudo unevenness and not including unevenness is prepared beforehand. Specifically, with regard to pseudo unevenness due to the optical design of the display panel, ray tracing simulation based on the design data of the display panel is performed to calculate the trajectories of light rays emitted from the backlight of the display panel. On the basis of this calculation result, the brightness distribution of the captured image is estimated with the positional relationship between the display panel and the camera taken into consideration. Pseudo unevenness due to the optical characteristics of the imaging unit is detected by using an integrating sphere. Thus pseudo unevenness occurring in the captured image is calculated, and a reference image is created.

Then, in the process for acquiring a shaped image shown in step S22 of FIG. 7, the reference image is subtracted from the shaped image obtained from the display panel under inspection. That is, a difference image between the shaped image and the reference image is found. Then the difference image is used to perform the processes shown in step S23 and the following steps.

Conventionally, when pseudo unevenness as described above occurs, it is difficult to automatically distinguish between pseudo unevenness and unevenness to be inspected, and hence inspection is forced to resort to determination by a human inspector. This has been another impediment to automatic unevenness inspection. However, according to this example, unevenness inspection can be performed automatically and accurately even when pseudo unevenness occurs. The configuration, operation, and effect in this example other than the foregoing are the same as those in the first example described above.

Next, a sixth example is described.

In this example, a plurality of captured images is acquired beforehand for a conforming display panel, and an averaged image is created therefrom. Next, the averaged image is shaped to form a reference image. The subsequent processes are the same as those in the fifth example described above. That is, in the process shown in step S22 of FIG. 7, the reference image is subtracted from the shaped image obtained from the display panel under inspection to find a difference image. Then the difference image is used to perform the processes shown in step S23 and the following steps. This example can also achieve the effect similar to that in the fifth example.

Next, a seventh example is described.

Figure 19:
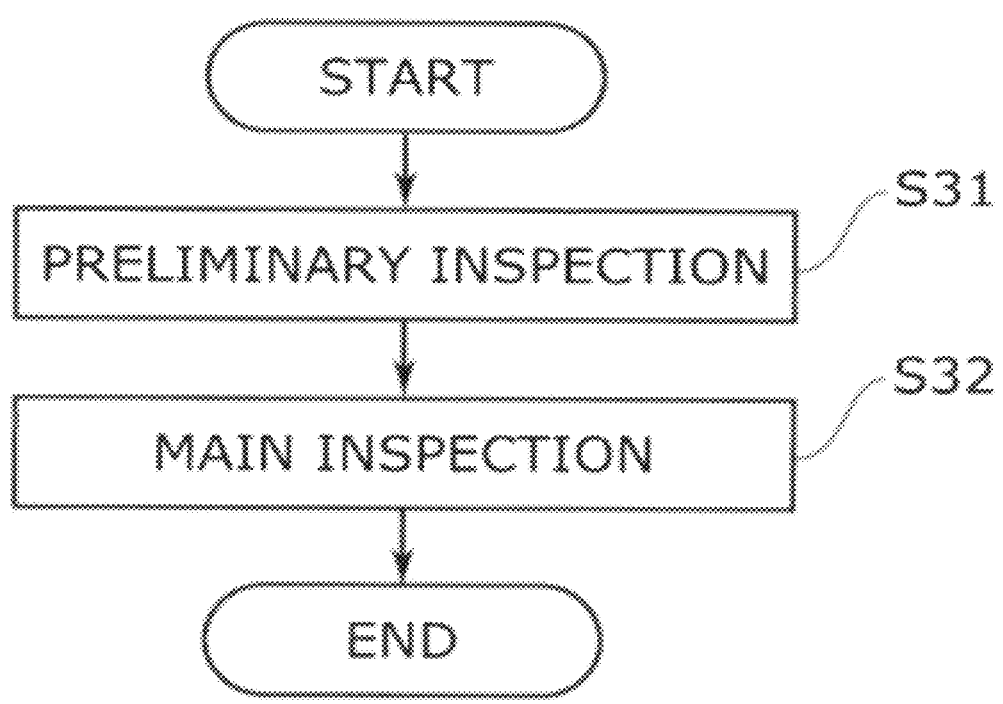
FIG. 19 is a flow chart illustrating an unevenness inspection method according to the seventh example.

FIG. 19 is a flow chart illustrating an unevenness inspection method according to this example.

Figure 20A:
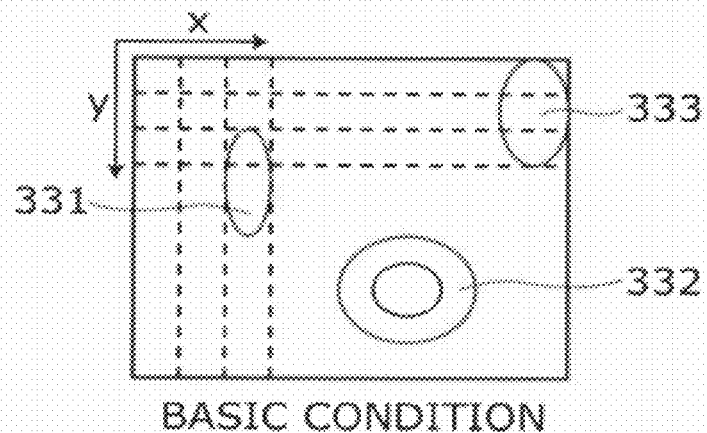
FIGS. 20A to 20C are schematic views illustrating primary images acquired in the preliminary inspection of the seventh example.
Figure 20B:
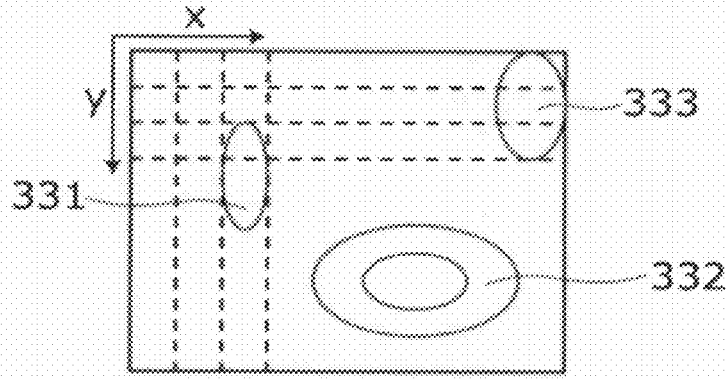
Figure 20C:
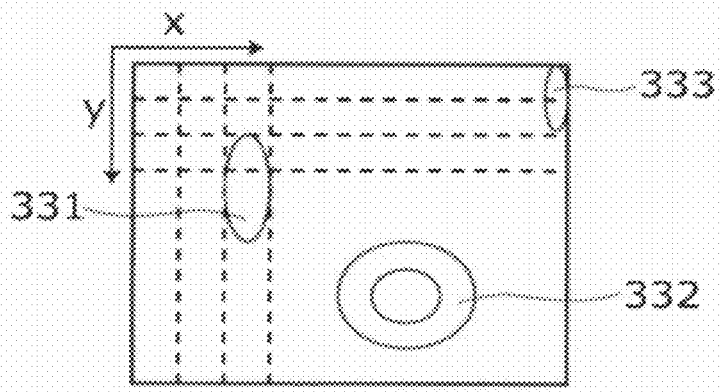

FIGS. 20A to 20C are schematic views illustrating primary images acquired in the preliminary inspection of this example.

As shown in FIG. 19, in this example, the preliminary inspection is first performed on all the display panels under inspection as shown in step S31. Then the main inspection shown in step S32 is performed on only the display panels determined to be highly likely to have unevenness as a result of the preliminary inspection.

In the preliminary inspection shown in step S31, a plurality of sets of conditions such as imaging angle and magnification ratio (zoom factor) are defined, and with the criteria of these sets of conditions biased toward overdetection, the unevenness inspection according to the first example described above is performed. Then, with regard to the set of conditions on which unevenness is detected, the level of each condition is slightly varied around the preset level, and unevenness inspection is performed again with the above criteria biased toward overdetection. For example, the condition in which unevenness is detected is defined as a basic condition. Then a condition with the magnification ratio, or the ratio of the imaging component density to the image element density of the display panel, being varied from the basic condition (magnification ratio varying condition) and a condition with the imaging angle being varied from the basic condition (imaging angle varying condition) are defined. Thus a total of three conditions are defined. Furthermore, in this example, at least on the basic condition, each image element of the display panel is imaged by nearly one imaging component.

By this preliminary inspection, primary images as shown in FIGS. 20A to 20C are obtained. FIG. 20A shows an image acquired on the basic condition, FIG. 20B shows an image acquired on the magnification ratio varying condition, and FIG. 20C shows an image acquired on the imaging angle varying condition. In this preliminary inspection, the criteria are biased toward overdetection. Hence, an image is determined to be likely to have unevenness unless the brightness difference throughout the image is within a certain range, that is, unless the captured image has a flat brightness distribution. For example, when the captured image includes moire or illumination reflection, it is determined to be likely to have unevenness irrespective of the presence of unevenness.

Then, the captured images with different imaging conditions are compared with each other to identify moire and illumination reflection, which are excluded from inspection. More specifically, on comparison between FIGS. 20A and 20B, the appearance of moire 332 is varied because of the difference in magnification ratio therebetween. In contrast, the appearance of unevenness 331 is not varied. This distinction in appearance is used to identify moire, and the moire is excluded from inspection. Furthermore, on comparison between FIGS. 20A and 20C, the appearance of illumination reflection 333 is varied because of the difference in imaging angle therebetween. In contrast, the appearance of unevenness 331 is not varied. Thus illumination reflection is identified and excluded from inspection. Display panels being highly likely to have unevenness are thus extracted.

Then the main inspection shown in step S32 is performed on only the display panels thus extracted. Here, imaging is performed with the imaging condition being minutely varied around the condition on which they are determined to be highly likely to have unevenness in the preliminary inspection. The main inspection shown in step S32 is the same as the unevenness inspection according to the first example described above.

According to this example, the preliminary inspection serves to reduce the number of display panels to be inspected and the number of levels of condition in the main inspection. Thus the time required for the main inspection can be reduced. On the other hand, in the preliminary inspection, images with low resolution are inspected with a small number of levels, and hence the time required is short. Therefore the time required for the overall inspection can be reduced. Thus, according to this example, the inspection time can be reduced with sufficient inspection accuracy ensured.

Next, an eighth example is described.

This example is a specific example of the second embodiment described above, and more particularly a specific example of the process for assembling a display panel shown in step S11 of FIG. 4. In the description of this example, an LCD is illustratively assembled as a display panel.

First, an array substrate is fabricated. Specifically, a polysilicon layer is grown on a glass substrate. A gate insulating film is formed on the polysilicon layer, and gate electrodes are formed on the gate insulating film. The polysilicon layer is doped with $P^+$-ions using the gate electrodes as a mask. Thus TFTs (thin film transistors) are fabricated. Then an interlayer insulating film is deposited so as to cover the gate electrodes, contact holes are formed in the interlayer insulating film, and interconnects are formed on the interlayer insulating film. Thus pixel circuits including TFTs are formed on the glass substrate. Subsequently, a planarization film is formed, pixel electrodes made of ITO (indium tin oxide) are formed, and a color filter (COA: color filter on array) is formed for each cell column.

Opposite electrodes made of ITO are formed on another glass substrate to fabricate an opposite substrate. Liquid crystal is dropped on each array substrate, which is laminated with an opposite substrate, thereby sealing between the two substrates. Thus an LCD is manufactured. Subsequently, as shown in step S12 of FIG. 4, unevenness inspection is performed. Any of the first to seventh example described above is applicable to this inspection.

The invention has been described with reference to embodiments and examples. However, the invention is not limited to these embodiments and examples. For instance, the above examples illustrate inspection of an LCD or other display panel. However, the invention is not limited thereto, but is also applicable to unevenness inspection of a PDP (plasma display panel). Furthermore, this invention is applicable to any inspection targets as long as defects like unevenness occur therein. For example, the invention is applicable to inspection of paint appearance.

In the above examples, a description is given primarily of the variation of imaging angle, which is illustratively taken as an example of imaging conditions. However, the invention is not limited thereto. For example, it is possible to vary one or more conditions among illumination brightness, zoom factor, focus position, light exposure, aperture, and shutter speed. In the case where the inspection target is a display panel, the tone and/or gradation of a test pattern displayed on the display panel may be varied in addition to the above conditions.

The above examples can be combined with each other in any way as long as technically feasible. Any modification to, and any addition and/or deletion of components in the above embodiments and examples and combinations thereof appropriately made by those skilled in the art are also encompassed within the scope of the invention as long as they do not depart from the spirit of the invention.

The invention claimed is:

1. An unevenness inspection method for inspecting presence of unevenness in a panel material, the method comprising:

acquiring a plurality of primary images by imaging an entirety of the panel material under inspection on a plurality of levels of condition;

creating a plurality of secondary images by processing the plurality of primary images to enhance variation of the primary images;

creating a composite image by combining the plurality of secondary images with a prescribed weighting, the prescribed weighting referring to a set of coefficients by which pixel values of the secondary image are multiplied, the set consisting of as many values as the number of the secondary images; and determining the presence of unevenness using the composite image, the prescribed weighting being determined using the panel material for training use having unevenness so that a region having the unevenness can be distinguished from another region not having the unevenness, when the plurality of secondary images are created for the panel material for training use having unevenness and are combined into a composite image.

2. The unevenness inspection method according to claim 1, wherein
the panel material is a display panel for displaying an image, and
in the acquiring a plurality of primary images, the condition includes one or more conditions selected from the group consisting of imaging angle, illumination brightness, zoom factor, focus position, light exposure, aperture, shutter speed, and tone and gradation of a test pattern displayed on the display panel.

3. The unevenness inspection method according to claim 1, wherein, in the creating a plurality of secondary images, the secondary images include one or more images selected from the group consisting of:
spatially differentiated images each obtained by spatially differentiating each of the primary images;
difference images calculated from two of the spatially differentiated images each obtained by spatially differentiating different primary images being imaged with different levels of the condition; and
a sum image based on the plurality of primary images imaged with different levels of the condition, and
the sum image is created for each particular region in the sum image by adding up, at a prescribed ratio, a pixel value of a region in a first primary image of the plurality of primary images corresponding to the particular region and the pixel value of a region in a second primary image corresponding to a region next to the particular region.

4. The unevenness inspection method according to claim 1, wherein, in the composite image associated with the panel material for training use, the prescribed weighting is determined to maximize a value of a ratio of a brightness entropy of the region having unevenness to a brightness entropy of the other region.

5. The unevenness inspection method according to claim 1, wherein
the panel material is a display panel having a plurality of periodically arranged image elements,
the acquiring a plurality of primary images includes:
obtaining a captured image by imaging the display panel, and
creating the primary image by forming one pixel by combination of a plurality of pixels consecutively arranged in the captured image,
in the obtaining a captured image, each image element of the display panel is imaged by a plurality of imaging components, and
in the creating the primary image by forming one pixel, the position and area of each of the regions are configured randomly in a prescribed range, each of the regions including a plurality of pixels arranged in the captured image.

6. The unevenness inspection method according to claim 1, wherein
the panel material is a display panel for displaying an image, and
the acquiring a plurality of primary images includes:
obtaining a captured image by imaging the display panel,
converting a signal representing the captured image from a signal in the space domain to a signal in the frequency domain,
removing frequency components corresponding to a Moire pattern from the signal in the frequency domain, and
converting the signal in the frequency domain from which the frequency components corresponding to the Moire pattern have been removed, to a signal in the space domain.

7. A method for manufacturing a display panel, comprising:
assembling a display panel; and
inspecting the display panel to inspect whether unevenness occurs in the display panel,
in the inspecting, executing an unevenness inspection method for inspecting presence of unevenness in a panel material, the unevenness inspection method comprising:
acquiring a plurality of primary images by imaging an entirety of the panel material under inspection on a plurality of levels of condition;
creating a plurality of secondary images by processing the plurality of primary images to enhance variation of the primary images;
creating a composite image by combining the plurality of secondary images with a prescribed weighting, the prescribed weighting referring to a set of coefficients by which pixel values of the secondary image are multiplied, the set consisting of as many values as the number of the secondary images; and
determining the presence of unevenness using the composite image,
the prescribed weighting being determined using the panel material for training use having unevenness so that a region having the unevenness can be distinguished from another region not having the unevenness, when the plurality of secondary images are created for the panel material for training use having unevenness and are combined into a composite image,
being performed using the display panel as the panel material under inspection.

8. An unevenness inspection apparatus for inspecting presence of unevenness in a panel material, the apparatus comprising:
an imaging unit configured to image an entirety of the panel material under inspection on a plurality of levels of condition; and
a computing unit configured to create a plurality of secondary images by processing a plurality of primary images acquired by the imaging unit to enhance variation of the primary images, to create a composite image by combining the plurality of secondary images with a prescribed weighting, the prescribed weighting referring to a set of coefficients by which pixel values of the secondary image are multiplied, the set consisting of as many values as the number of the secondary images, and to determine the presence of unevenness using the composite image,
the prescribed weighting being determined using the panel material for training use having unevenness so that a region having the unevenness can be distinguished from another region not having the unevenness when the plurality of secondary images are created for the panel material for training use having unevenness and are combined into a composite image.

* * * * *